(12) United States Patent
Lavy et al.

(10) Patent No.: US 11,428,537 B2
(45) Date of Patent: Aug. 30, 2022

(54) LOCALIZATION AND MAPPING METHODS USING VAST IMAGERY AND SENSORY DATA COLLECTED FROM LAND AND AIR VEHICLES

(71) Applicant: Nexar Ltd., Tel Aviv (IL)

(72) Inventors: Lev Yitzhak Lavy, Misgav Dov (IL); Shmuel Rippa, Ramat Gan (IL); Elad Levi, Tel Aviv (IL); Roei Herzig, Hod Hasharon (IL); Eliahu Brosh, Ramat Hasharon (IL)

(73) Assignee: Nexar, Ltd., Tel Aviv (IL)

( * ) Notice: Subject to any disclaimer, the term of this patent is extended or adjusted under 35 U.S.C. 154(b) by 354 days.

(21) Appl. No.: 16/820,913

(22) Filed: Mar. 17, 2020

(65) Prior Publication Data

US 2020/0309541 A1    Oct. 1, 2020

Related U.S. Application Data

(60) Provisional application No. 62/825,764, filed on Mar. 28, 2019.

(51) Int. Cl.
| | |
|---|---|
| *H04N 5/225* | (2006.01) |
| *G01C 21/32* | (2006.01) |
| *G06K 9/62* | (2022.01) |
| *G01S 19/42* | (2010.01) |
| *G06V 20/10* | (2022.01) |
| *G06V 20/56* | (2022.01) |

(52) U.S. Cl.
CPC .............. *G01C 21/32* (2013.01); *G01S 19/42* (2013.01); *G06K 9/6256* (2013.01); *G06V 20/176* (2022.01); *G06V 20/182* (2022.01); *G06V 20/588* (2022.01); *H04N 5/2253* (2013.01)

(58) Field of Classification Search
CPC ...................................................... H04N 5/2253
USPC ............................................................ 701/448
See application file for complete search history.

(56) References Cited

U.S. PATENT DOCUMENTS

| | | | | |
|---|---|---|---|---|
| 10,794,710 | B1 * | 10/2020 | Liu ........................ | G06V 10/82 |
| 2019/0121364 | A1 * | 4/2019 | Tsai ....................... | G06V 20/56 |

OTHER PUBLICATIONS

Hoffer et al., "Deep metric learning using triplet network", International Conference on Learning Representations (ICLR) 2015, 8 pages.

* cited by examiner

*Primary Examiner* — Joel W Fosselman
(74) *Attorney, Agent, or Firm* — Soquel Group I.P Ltd.

(57) ABSTRACT

A system for training simultaneous localization and mapping (SLAM) models, including a camera, mounted in a vehicle and in communication with an image server via a cellular connection, that captures images labeled with a geographic position system location and a timestamp, and uploads them to an image server, a storage device that stores geographical maps and images, and indexes the images geographically with reference to the geographical maps, an images server that receives uploaded images, labels the uploaded images with a GPS location and a timestamp, and stores the uploaded images on the storage device, and a training server that trains a SLAM model using images labeled with a GPS location and a timestamp, wherein the SLAM model (i) receives an image as input and predicts the image location as output, and/or (ii) receives an image having error as input and predicts a local correction for the image as output.

20 Claims, 23 Drawing Sheets

LOCALIZATION AND MAPPING METHODS USING VAST IMAGERY AND SENSORY DATA COLLECTED FROM LAND AND AIR VEHICLES

PRIORITY REFERENCE TO PROVISIONAL APPLICATION

This application claims benefit of and hereby incorporates by reference U.S. Provisional Application No. 62/825,764, entitled LOCALIZATION AND MAPPING METHODS USING VAST IMAGERY AND SENSORY DATA COLLECTED FROM LAND AND AIR VEHICLES, and filed on Mar. 28, 2019 by inventors Lev Yitzhak Lavy, Shmuel Rippa, Elad Levi, Roei Herzig and Eliahu Brosh, the contents of which are hereby incorporated by reference in their entirety.

FIELD OF THE INVENTION

The field of the present invention is simultaneous localization and mapping (SLAM) for moving vehicles.

BACKGROUND OF THE INVENTION

Today's standard for localization is GPS. While GPS is improving by integration of Wi-Fi, cellular and inertial sensor data, GPS still has accuracy limitations of 5-10 meters in a best driving environment, and degrades to accuracy imitations of 20-30 meter accuracy in urban canyons, bad weather and remote locations. Accurate self-localization has many benefits in both navigation, vehicle-to-vehicle (V2V) communication, and other uses such as mapping. Vice versa, mapping greatly assists self-localization.

SUMMARY

Embodiments of the present invention provide localization and mapping for motor vehicles, based on imagery captured by cameras in the vehicles and based on geographical land and aerial maps. In some embodiments, the present invention provides "snap-to-satellite (Snap2Sat)" capability, i.e., mapping a motor vehicle route to a corresponding portion of a satellite image.

There is thus provided in accordance with an embodiment of the present invention a system for training simultaneous localization and mapping (SLAM) models, including a camera, mounted in a vehicle and in communication with an image server via a cellular connection, that captures images labeled with a geographic position system location and a timestamp, and uploads them to an image server, a storage device that stores geographical maps and images, and indexes the images geographically with reference to the geographical maps, an images server that receives uploaded images, labels the uploaded images with a GPS location and a timestamp, and stores the uploaded images on the storage device, and a training server that trains a SLAM model using images labeled with a GPS location and a timestamp, wherein the SLAM model (i) receives an image as input and predicts the image location as output, and/or (ii) receives an image having error as input and predicts a local correction for the image as output.

There is additionally provided in accordance with an embodiment of the present invention a method for training simultaneous localization and mapping (SLAM) models, including capturing a sequence of road images by a vehicle dashboard camera, while the vehicle is moving, labeling the captured road images with time and GPS location, creating feature representations of the captured road images, further creating a feature representation of a map tile from aerial imagery, the map tile covering the area where the vehicle is traveling, and triangulating vehicle location and correcting GPS errors, including training a SLAM model to use feature representations of the road images and of the map tile.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

Table of elements in the figures

Figure 1:
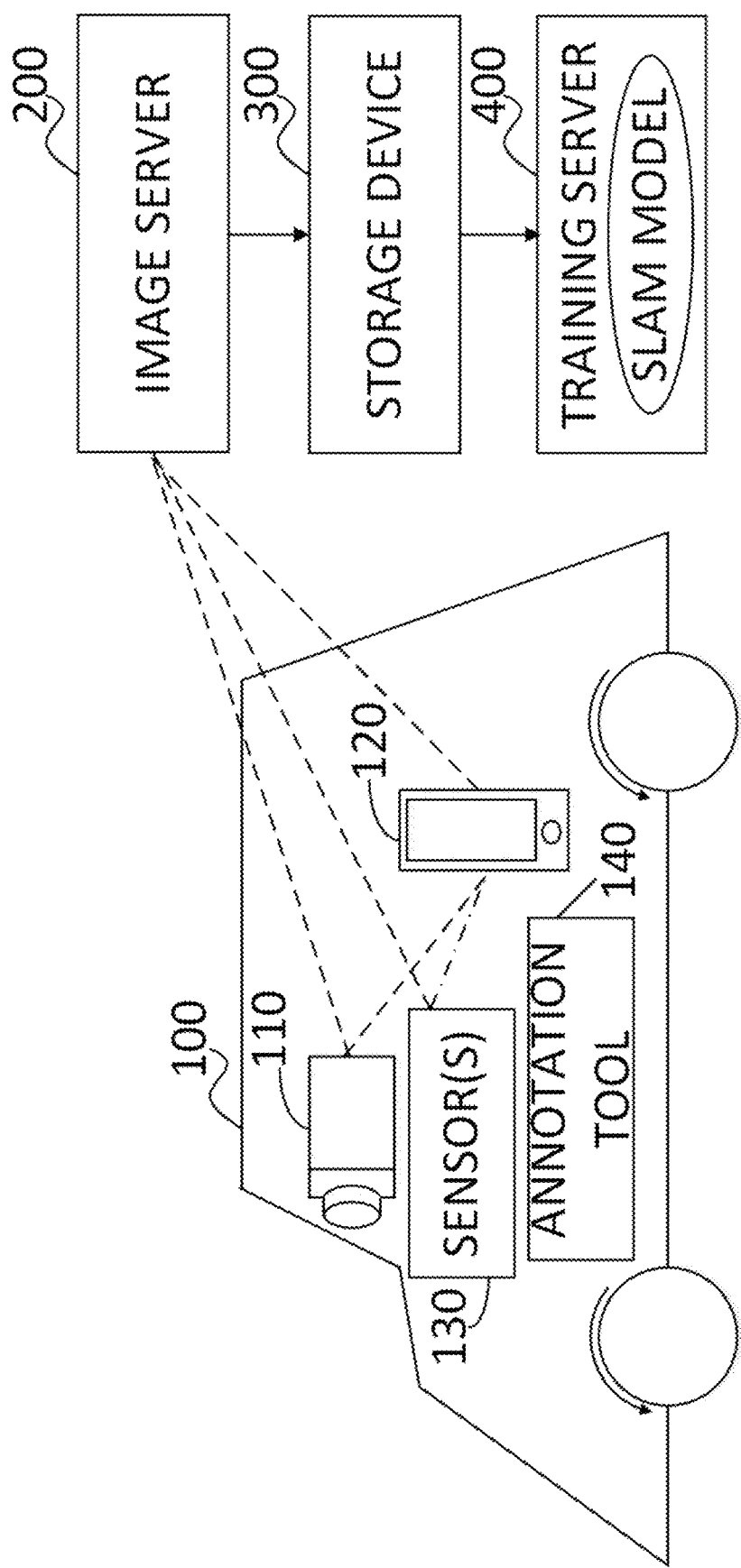
FIG. 1 is a simplified block diagram of a system for training simultaneous localization and mapping (SLAM) models, in accordance with an embodiment of the present invention.

| Element | Description |
| --- | --- |
| 100 | moving vehicle |
| 110 | dashboard camera |
| 111 | first captured road image |
| 112 | second captured road image |
| 120 | smartphone |
| 130 | sensor(s) |
| 140 | annotation tool |
| 200 | image server |
| 210 | map fetcher |
| 220 | image concatenator |
| 230 | feature extractor |
| 240 | feature concatenator |
| 250 | error estimator |
| 260 | path finder |
| 270 | aerial/satellite map tile |
| 280 | road map tile |
| 300 | storage device |
| 400 | training server |
| 410 | SLAM model |

Elements numbered in the 1000's are operations of flow charts.

DETAILED DESCRIPTION

Glossary

The following definitions are employed throughout the specification.

FRAME-ON-DEMAND (FOD)—A single image extracted from a camera in response to a trigger from the camera or from server computers.

INCIDENT VIDEO—video captured by a trigger such as collision detection, by sensors, manual incident set by a user retroactively, and other triggers, usually at a full frame rate (30 fps).

ROAD MAP—a map containing an abstract representation of road related data; e.g., roads are represented by lines, intersections are represented by line crossings, buildings are represented by their contours, and parks are represented by green patches.

STREET-LAPSE VIDEO—video captured at intervals of distance instead of time to allow large spatial coverage at lower bandwidth.

TIME-LAPSE VIDEO—video captured at a low frame rate, typically at 1 fps but can vary.

VIDEO-ON-DEMAND (VOD)—Video (time lapse or other forms) where a trigger is from the server.

Today's standard for motor vehicle localization is GPS. While GPS is improving by integrating Wi-Fi, cellular and inertial sensor data, GPS accuracy limitation is 5-10 meters if driving conditions are good, and degrades to 20-30 meters in urban canyons, bad weather and remote locations. Accurate self-localization is important for navigation, vehicle-to-vehicle (V2V) communication, and for other uses such as mapping. Vice versa, mapping greatly assists self-localization. Harvesting of data is essential for mapping and self-localization.

Embodiments of the subject invention provide a system that uses a network of connected dashboard cameras ("dashcams"), where the dashcam is a mobile phone camera or a camera connected to the Internet directly or via a mobile application to upload signals and imagery to a server. The system saves imagery/video and indexes it with a location and time label and other GPS information, and generates vast datasets for localization and mapping. The system allows iterations where, in some embodiments, localization models are trained and then improved. Labels are added to raw localization data, to improve datasets used for training mapping models.

Embodiments of the subject invention use a mobile phone for storage, and use a driver's home/office Wi-Fi to upload and sync collected signals/video/imagery on servers without use of cellular bandwidth. Advantages of the system include the dual ability (i) to localize and map, and (ii) to improve data density for geographic areas that lack sufficient amount of data, by triggering frame/video extraction over cellular in geo-fenced areas.

For a large portion of the USA, Europe and other countries there is coverage of high-resolution satellite aerial imagery providing top views of roads. There are also cameras on the roads, looking forward and seeing the same roads from a driving perspective. Embodiments of the subject invention provide methods that combine GPS, driving view and top view to yield high accuracy, map aligned global positioning in real time.

Reference is made to FIG. 1, which is a simplified block diagram of a system for training simultaneous localization and mapping (SLAM) models, in accordance with an embodiment of the present invention. Shown in FIG. 1 is a moving vehicle 100 that includes a dashboard camera 110 for capturing road images. Camera 110 transmits the captured images to an image server via cellular communication. Alternatively, camera 110 may stream the captured images to a smartphone 120 in the vehicle, and smartphone 120 then transmits the captured images to image server 200. Vehicle 100 also includes one or more other sensor(s) 130, which also transmit data to image server 200, either directly or via streaming to smartphone 120. Vehicle 100 also includes an annotation tool 140 for annotating road images, as described hereinbelow.

Image server 200 processes the captured images that it receives, either directly from camera 110 or from smartphone 120, and stores the processed images on a storage device 300. A training server 400 uses the images stored on storage 300 to train a SLAM model.

Figure 2:
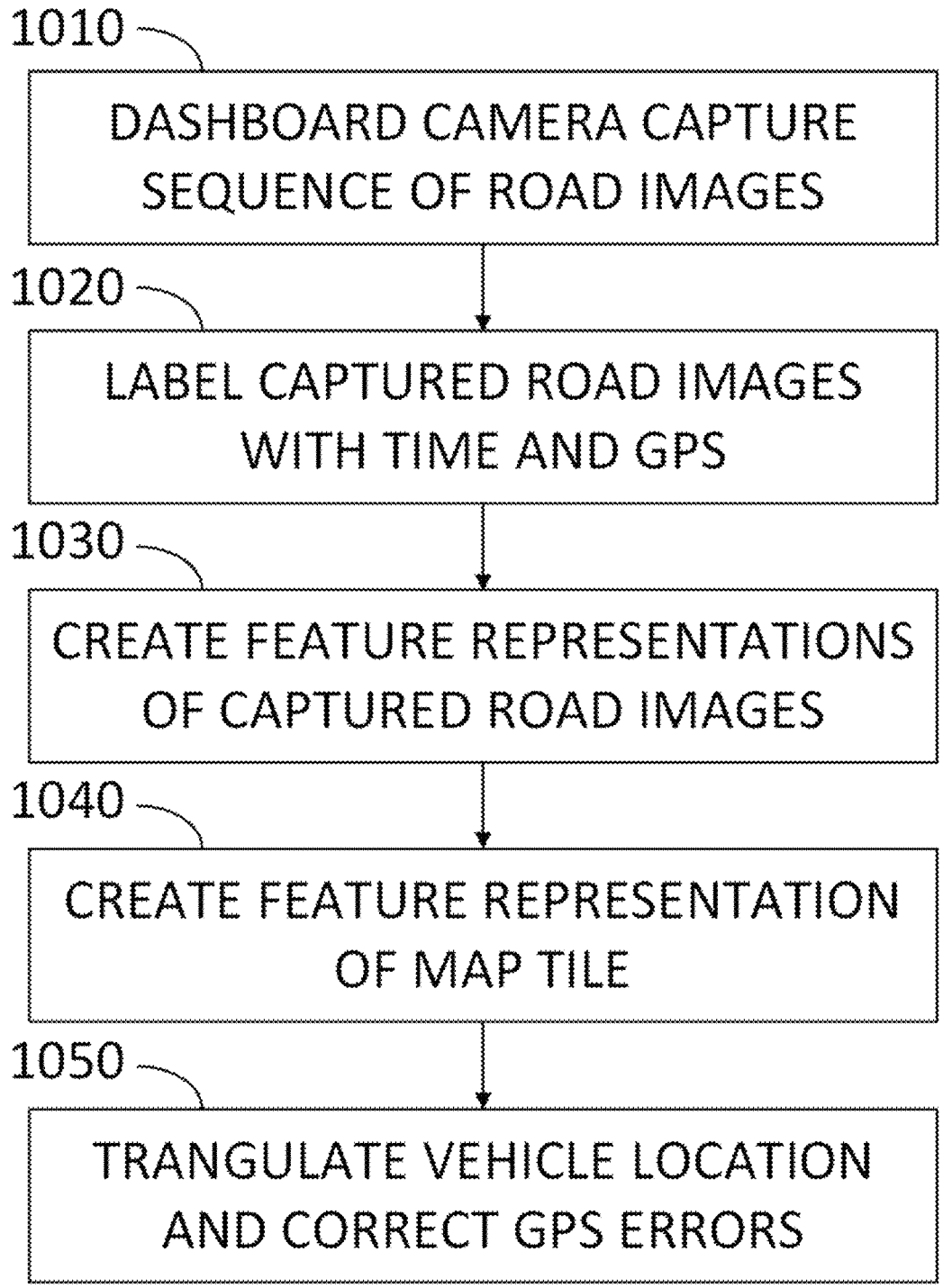
FIG. 2 is a simplified flowchart of a method for training SLAM models, in accordance with an embodiment of the present invention.

Reference is made to FIG. 2, which is a simplified flowchart of a method for training SLAM models, in accordance with an embodiment of the present invention. At operation 1010 a dashboard camera mounted on a moving vehicle captures a sequence of road images, and uploads them to image server 200. At operation 1020 images server 200, which receives the captured road images, labels the road images with time and geographic positioning system (GPS) location. At operation 1030 image server 200 creates feature representations of the road images. At operation 1040 images server 200 creates feature representations of a map tile from aerial imagery, the map tile covering the area where the vehicle is traveling. At operation 1050 the image server triangulates vehicle location and corrects GPS errors, by training a SLAM model to use feature representations of the road images and of the map tile.

In accordance with embodiments of the present invention, the system of FIG. 1 includes lidar or radar transmitters embedded in vehicle 100, sending lidar or radar data to image server 200, wherein the lidar or radar data are treated as visual data and are uploaded to image server 200.

In accordance with embodiments of the present invention, data from other sensor(s) 130 is gathered and passed for localization in the same form as images, the other sensors including one or more of: an external camera, a phone or other accelerometer, a magnetometer, a gyroscope and a barometer. Moreover, collection of image data is not always coupled with collection of sensor data, thus allowing vast collection of low-bandwidth sensory data.

In accordance with embodiments of the present invention, training server 400 trains vector features of sensor data to generate mapping of explainable elements, and uses similarity to a give labeled small set of elements, including speed bumps, turns and pot holes. Additionally, sensor(s) 130 signals are processed in a time domain and split into time intervals with location and time labels, or processed in a spatial domain and split into regions according to distance with location and time labels. Further, sensor(s) 130 data is used to improve ego motion of vehicle 100 using sensor fusion. Yet further, sensor(s) 130 data is collected and mapped to road conditions.

In accordance with embodiments of the present invention, dashboard camera 100 uses real-time streaming protocol (RTSP) or such other wireless data streaming transmission. Alternatively, dashboard camera may be a USB webcam which uses wired transmission.

In accordance with embodiments of the present invention, image server 200 actively, or by setting a policy on dashboard camera 100, sets a trigger to upload captured images having a high priority over a cellular network. In accordance with embodiments of the present invention, the policy is set to upload images for which the density or freshness of data is slower than desired.

In accordance with embodiments of the present invention, the captured road images form a video sequence, and the GPS and time labels also form a sequence, and image server 200 generates a mapping to synchronize between the images and the labels. Additionally, the video sequence is a time-lapse or a street-lapse sequence, with images separated by time or distance intervals, respectively.

In accordance with embodiments of the present invention, training server 400 trains the SLAM model with sequences of images to generate two-dimensional ego motion vehicle dynamics for steering and speed, in a local moving coordinate system of vehicle 100 described below with reference to FIG. 6.

In accordance with embodiments of the present invention, ego motion of vehicle 100 is used to propagate location between location fixes using a Kalman particle filter or such other filter. Alternatively, one or more dynamic layer(s) of the model and location prediction are used in a sequence-to-sequence or other recurrent model to optimize a full route prediction. Further, in addition to dynamics and location regression prediction, a set of binary outputs are trained as bins of output with classification loss, and then, using a cumulative distribution function (CDF) and a desired error distribution, an error is computed in physical units of the regression output to enable proper use of the error in aggregation methods. Yet further, two-dimensional dynamics are used to align mobile phone gyro, accelerometer and magnetometer sensors to vehicle 100 local moving coordinate system, using a rotation matrix generated to match the three-dimensional dynamics generated by smartphone 120 sensor fusion to the two-dimensional dynamics generate by an ego motion model for dashboard camera 110. Moreover, fusion of the methods, or each method separately, is used for collision reconstruction off-line, together with lane level maps and self-localization methods. Additionally, the three-dimensional dynamics in vehicle 100 local moving coordinates collected by fusion with sensor(s) 130 is used to re-train the SLAM model to output three-dimensional ego motion of vehicle 100 from vision. Further, fusion of the methods, or each method separately, is used for offline reconstruction together with lane-level maps and self-localization methods. Yet further, training server 400 improves self-localization by a combination of the methods described hereinabove, before applying the mapping, and full three-dimensional dynamics is used to determine three-dimensional location of detection.

In accordance with embodiments of the present invention, training server 400 generates maps using bounding box or other methods for detecting objects in an image; whereby with known physical dimensions and camera parameters, or using ego motion, locations of the objects relative to vehicle 100 are determined, and positioned globally using self-localization of vehicle 100. Additionally, each detection has a context to identify it across trips, using image search similarity methods. Further, self-localization is improved in training server 400 by a combination of the methods described hereinabove, before applying the mapping, and full three-dimensional dynamics are used to determine three-dimensional location of detection. Yet further, aggregation is performed using a similarity score. Moreover, objects are added to a map and later used for improved self-localization using sparse anchors with a trained holistic model. Additionally, a pre-trained object detector runs on a mobile client, and uses a sparse map of objects with known location dimension and class to determine triangulation. Further, each detection and sequence related to a mapped element is aggregated, to better position the object and to determine visibility; e.g., from where the object may be seen, at which day/night times and from which angles, and to track changes over time. Yet further, objects changing over time include appearance; e.g., clarification of a road sign or a road marking. Moreover, each object type presence is a class, and is only tracked when it starts to be detected and when it stops, to generate a naïve simple map. Additionally, the map is updated and change detection is propagated to vehicle-to-vehicle (V2V) networks and municipalities, to allow vehicles and municipalities to react to the change; e.g., a traffic light that was previously detected is now missing.

In accordance with embodiments of the present invention, annotation tool 140 enables a human to mark a vehicle route for an uploaded image or sequence of images, by marking key points in an aerial map, wherein GPS output is generated by a vehicle motion algorithm and is used to allow meter-accuracy benchmarking for localization methods, and wherein annotation tool 140 shows the video synced to GPS route on aerial imagery, and allows marking ground truth at the time of the video.

In accordance with embodiments of the present invention, annotation tool 140 present other trips from the same location, to allow annotation in bad visibility conditions. Additionally, annotation tool 140 allows multiple users to annotate the same incidents, and generates error estimates for the human annotations using a variance of the measurements.

In accordance with embodiments of the present invention, repeated annotation on the same incidents is used to evaluate an annotator's expertise and to give the annotator feedback, or to identify a best annotator.

In accordance with embodiments of the present invention, the SLAM model accepts raster or vector roadmap input and/or aerial images, and is trained to snap-to-satellite using a camera 110 image and an augmented GPS error. Additionally, aerial images are pre-processed to generate a segmented map with roads, crossings, lanes and other road features that are represented per pixel by a probability map. Further, the model that generates the segmentation is trained on human annotated data that is generated on a base aerial map. Yet further, lanes are first fixed using a one-dimensional cross-section of an aerial map or a segmented map, and a one-dimensional cross-section of the road ahead is used, in order to reduce computation and over-fit. Moreover, properties of vector or pixel elements are determined by aggregation of GPS data, e.g., lane direction and allowed turning points, and training server 400 aggregates raw GPS data to determine allowed driving path/courses per lane, and speeds. Additionally, the maps are used as input to transportation simulation systems, to simulate events on real road networks with lane-level accuracy. Further, training server 400 performs localization fix prior to aggregation. Yet further, classes include lanes, lane separation types, sidewalks, parking lots, buildings, crossings, tree centers, road markings, road edges, and other features that assist localization and visibility from above, such as bridges and highway signs. Moreover, training server 400 uses the segmented map or the aerial map to train the SLAM model to output a vector map with annotated features. Additionally, properties of vector or pixel elements are determined by aggregation of GPS data, e.g., lane direction and allowed turning points, to determine allowed driving path/courses per lane, and speeds. Further, the maps are used as inputs to transportation simulation systems, to simulate events on real road networks with lane-level accuracy. Yet further, training server 400 performs localization fix prior to aggregation. Moreover, the reverse SLAM model is trained, after dashboard camera 110 is localized, to predict an aerial map tile relative to vehicle 100 location as a road scanner, based on images captured by dashboard camera 110, and pixel/vector elements are predicted while ground truth is obtained from the original mapping on aerial images/road maps. Additionally, the prediction includes confidence levels per pixel/feature, where another model is trained to aggregate a sequence of measurements to obtain highest accuracy. Further, the prediction is used to update the maps, and to provide a service that generates alerts regarding outdated tiles. Yet further, map tiles are downloaded from a server in real time or in advance, for off-line localization in vehicle 100.

In accordance with embodiments of the present invention, training server 400 trains the SLAM model (i) using image search, with input images from dashboard camera 110 and outputs embedding vector features that later, after inner multiplying them with other feature vectors from other images in the same area, produce similar estimation; and (ii) using similarity to triangulate to anchors around a GPS location, wherein feature vectors of images with location and time are generated per geographic cell, or with an image feature vector stored without a cell formation but in a free r-tree or other indexing method allowing for fast search. Additionally, feature vectors are stored in a database where the units are: (i) road segments to allow snap-to-road; (ii) hexagons or other fixed geographic cells; (iii) adaptive size cells according to read features or data density; and (iv) r-tree of other multi-dimensional sorted storage methods, and wherein the database is split into geographical top-level units, such as city and country. Further, the process is iterative and vector feature location is improved according to multiple neighbors. Yet further, training server 400 trains similarity using a triplet/multiplet method, where the model receives one or more anchor images from the same location, and one or more negative images from a different location, and minimizes similarity in case of the same area, and maximizes similarity for different area, using an intermediate layer which is a feature vector that is also output for use in the mapping process, and wherein, in the mapping process, only the feature vector is computed for the incoming image and indexed with the GPS output. Moreover, the feature vectors are normalized.

In accordance with embodiments of the present invention, training server 400 trains similarity by a Siamese method whereby the SLAM model receives an anchor image from the same location or a negative image from a different location, and minimizes similarity in case of the same area, and maximizes similarity in case of a different area, using an intermediate layer which is a feature vector that is also output for use in the mapping process, and wherein for the mapping process, only the feature vector is computed for the incoming image and indexed with GPS output. Additionally, the feature vectors are normalized. Further, the model outputs distance in meters to vehicle sides and front, and angle relative to a given feature vector. Yet further, training server 400 first trains the SLAM model using a similarity metric and, after a first iteration of localization, another iteration is performed for fine-tuning learning of smaller distances between images. Moreover, regression output of distance and angle is transformed to global position coordinates and fixed according to multiple anchors. Additionally, images across different trips are selected to generate a hyper-lapse that keeps initial trip dynamics and location, and frames are selected from changing time to allow a time-travel effect in a ride, in order to create a video with special effects that appears smoother. Further, localization in a direction normal to the road lane is first fixed using a Snap2Sat method. Yet further, images for the search are reorganized in accordance with a sorting model that detects which image comes first along the road, between each pair of images. Moreover, training serve 400 trains the reordering using ego motion to allow estimation of angle and distance displacement in the same trip and across different trips.

In accordance with embodiments of the present invention, training server 400 trains the SLAM model in multiple complexity levels, where computation and memory constraints are set, and thus the model is available in multiple computed points allowing partial compute and midpoint static propagation between client and server. Additionally, a combination of methods described hereinabove is used to achieve highest accuracy of localization of dashboard camera 110 images prior to using localization for mapping.

Further, a low-computational SLAM model is distributed for real-time use in a smartphone 120 application or in firmware of embedded dashboard camera 110. Yet further, for localization, dashboard camera 110 images are processed locally in vehicle 100 to generate a feature vector, which is sent to image server 200 for a visual image search and for map-matching. Moreover, low dimensionality of a captured image is stored and uploaded instead of or in addition to the image data, as an additional signal. Additionally, localization is performed in real time such that navigation instructions are more accurate and context aware. Further, wrong turn/exit or other aviation errors are quickly recognized and a new route calculation is triggered. Yet further, when a driver follows an instruction, repeated instructions are avoided. Moreover, the compressed feature vector is carried by the V2V network, allowing improved warning updates. Additionally, the localization fix performed by training server 400 is sent back to vehicle 100. In accordance with embodiments of the present invention, the localization fix is delayed, and vehicle 100 propagates location using inertial measurement units (IMUs) and visual ego motion to current time.

In accordance with embodiments of the present invention, the captured road images are anonymized, to avoid inclusion of personal information.

In accordance with embodiments of the present invention, improved localization is used to select road images from a data set, allowing navigation in a street-view server, where proximity in time, distance and angle is generated according to desired location with higher similarity to previous images, thereby allowed a smooth transition between images of a sequence.

In accordance with embodiments of the present invention, road images are first snapped to road maps as a baseline for further localization, using GPS for normalization.

In accordance with embodiments of the present invention, in case of low data integrity, e.g., with a simple camera, a captured image syncs to sensor(s) 130 data, and GPS from smartphone 120 and ego motion are used by image server 200 to perform time synchronization on a sequence of captured images. Additionally, if captured images from dashboard camera 110 contain timestamp and/or GPS data, this data is extracted using optical character recognition (OCR).

In accordance with embodiments of the present invention, the system includes a deletion tool (not shown), whereby a driver deletes his own data and elects to delete a trip or an incident, from local storage and from storage device 300, and the data is also removed from the SLAM model's training and testing, thus ensuring that the driver's deletion propagates to the full system.

In accordance with embodiments of the present invention, training server 400 trains the SLAM model for a specific location, for specific dates, for specific weather conditions, and/or for specific time(s) of day.

In accordance with embodiments of the present invention, portions of road image data are stored on smartphone 120, and transmitted over a Wi-Fi connection to image server 200, in order to conserve cellular bandwidth. Additionally, captured image uploads are timed to occur overnight or at other selected times, to avoid clogging a driver's Wi-Fi connection. Further, minimal impact on a user's home usage is automatically detected by Wi-Fi upload speed. Yet further, datasets and the SLAM model trained on the datasets are specialized to geo-fenced areas or times of day, or weather conditions, to ensure minimizing feature vectors and improving localization with a minimal set of parameters.

In accordance with embodiments of the present invention, dashboard camera 110 is a mobile phone mounted on vehicle 100 dashboard or windshield.

In accordance with embodiments of the present invention, labelling operation 1020 also labels the captured road images with inertial measurement data based on inertial measurement unit (IMU) sensors. Additionally, the IMU sensors include one or more of a mobile phone, a vehicle controller area network (CAN) bus, an on-board diagnostics (OBD) module, electronic wearables, and other in-vehicle sources of data.

In accordance with embodiments of the present invention, the method of FIG. 2 also includes compressing each road image using triplets, whereby a positive image is trained with an anchor from the same geographic area as a road image, and a negative image is trained with an anchor from a different geographic area, and correcting vehicle 100 location using the compressed anchors.

In accordance with embodiments of the present invention, the method of FIG. 2 also includes correcting localization error by compressing a map tile via a trained compression model that compresses a map tile to a feature vector, including providing a road image to the compression model together with the map tile, and training the compression model to fit the road image to the map tile, thereby generating a compressed vector representation of the map tile including correlated aerial and road view information.

In accordance with embodiments of the present invention, the method of FIG. 2 also includes generating a full geographic area of compressed vector/pixel level segmentation of the map tile, including annotating the map tile using segmentation and vector annotation of lanes, road borders, road features and road crossings, and training the SLAM model on the annotated data. Additionally, the compressed vector/pixel level segmentation of the map tile is continually updated, from up-to-date dashboard camera 110 road images.

In accordance with embodiments of the present invention, the method of FIG. 2 uses a sparse representation for representing lanes and distance from a stop line, to enable low-computation mobile execution of a thin version of the SLAM model.

In accordance with embodiments of the present invention, training server 400 trains the SLAM model on image sequences to predict ego motion including speed, steering and course fix, and the method of FIG. 2 aggregates error estimation in real time to correct location, and for use in dead reckoning when GPS is not available. Additionally, training server 400 trains the SLAM model to predict vehicle location from a sequence of images and GPS and other sensor data, based on the compressed map tiles and/or the compressed road images.

In accordance with embodiments of the present invention, the method of FIG. 2 uses the captured dashboard camera 100 road images to train the SLAM model to predict if a map tile is outdated in some areas. Additionally, a satellite raster image tile in road areas that are visible in both road and aerial views is updated, via an updating model that uses a sequence of images from dashboard camera 110 in proximity of vehicle 100 location, by training the updating model on up-to-date tiles with augmentation as occlusion of an area, thereby generating, via the updating model, a set of map pixels updates as output from a set of road images that are provided as input.

In accordance with embodiments of the present invention, the method of FIG. 2 estimates freshness of a map tile and visibility from vehicle 100 using pixel-level confidence intervals.

In accordance with embodiments of the present invention, the method of FIG. 2 aggregates multiple road images in the same location or geographic unit of given dimensions, to a single vector, and uses the single vector for localization.

In accordance with embodiments of the present invention, the method of FIG. 2 generates a map of given detection classes for a desired location, using an ego motion model, GPS and IMU aggregation, and derives location of an object and its physical size from (i) dashboard camera 110 parameters and a pinhole equation, (ii) multiple views in time, and (iii) ego motion and location of vehicle 100.

In accordance with embodiments of the present invention, the method of FIG. 2 runs localization in real time on smartphone 120, via an external camera on moving vehicle 100 that uses smartphone 120 camera, or that streams video to smartphone 120, and transmits localization correction to image server 200 and/or to other vehicles via a V2V network, thereby enabling advanced driver-assistance system (ADAS) warnings across vehicles to be accurate, and enabling warnings to be generated and dispatched to proper drivers in real time according to the location of the drivers' vehicles. Additionally, the method of FIG. 2 improves navigation instructions and corrects navigation errors quickly, by using exact real-time location, whereby instructions, using a segmented map context and map matching to it with driver destination, give proper warnings and avoid repeated warnings if a driver already followed the instructions.

In accordance with embodiments of the present invention, the method of FIG. 2 is used in combination with an historic probability map based on vast GPS raw data obtained on a given geographic area.

In accordance with embodiments of the present invention, the method of FIG. 2 is used to improve data gathered using time-lapse or street-lapse, thereby enabling users to sync large time periods.

In accordance with embodiments of the present invention, the method of FIG. 2 is used to simulate traffic flow on road maps.

In accordance with embodiments of the present invention, the method of FIG. 2 is used for full six degrees of freedom collision reconstruction.

Figure 3:
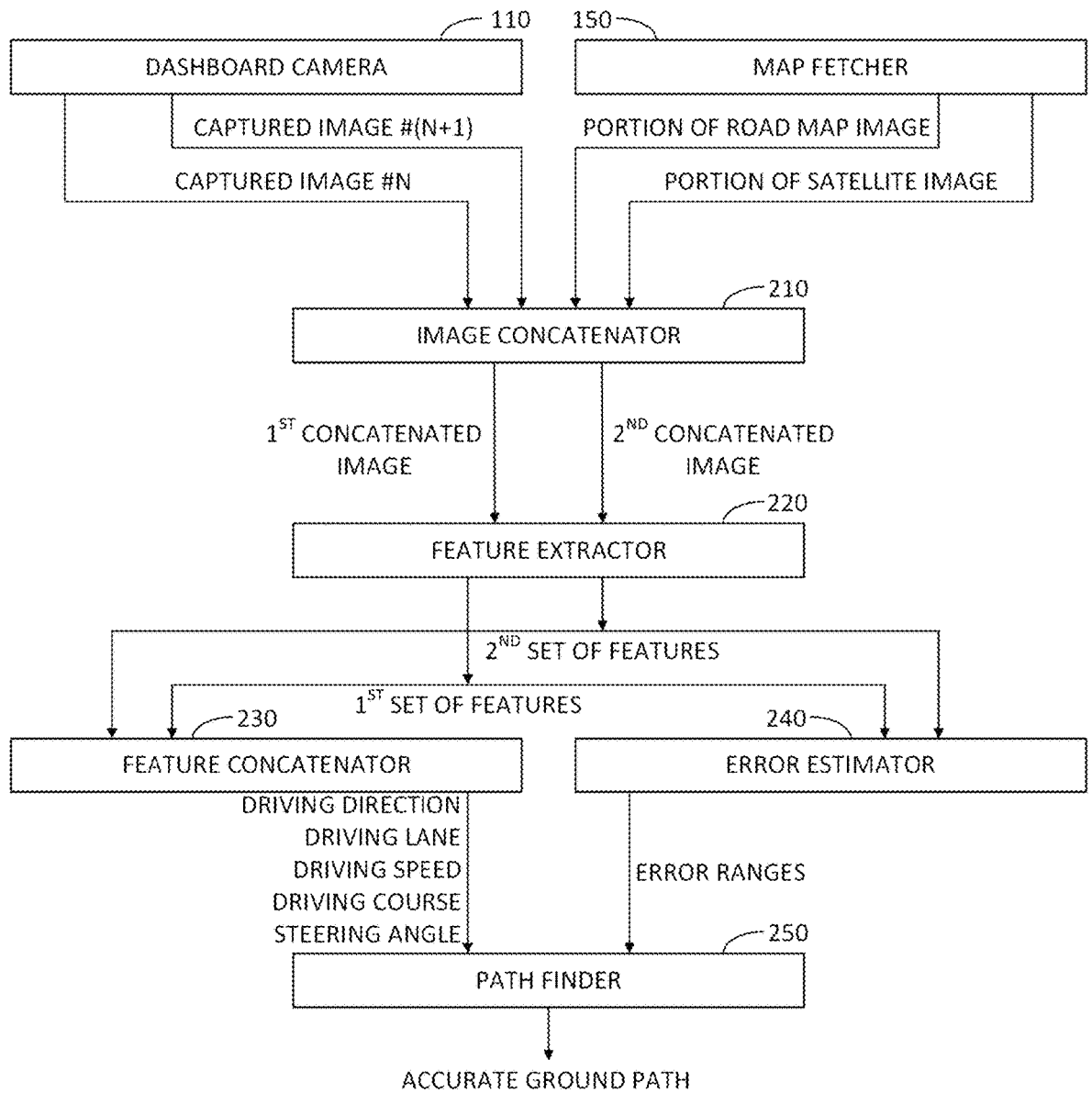
FIG. 3 is a simplified diagram of a snap-to-satellite ("Snap2Sat") path finder system for moving vehicles, in accordance with an embodiment of the present invention.

Reference is made to FIG. 3, which is a simplified diagram of a snap-to-satellite ("Snap2Sat") path finder system for moving vehicles, in accordance with an embodiment of the present invention. Shown in FIG. 3 is dashboard camera 110, which captures a sequence of road images, and uploads the capture road images to image server 200. Image server 200, which receives the uploaded captured road images, processes the images in sequence, two successive images, image #N and image #(N+1) at a time. Image server includes a map fetcher 210, which fetches a first map tile from a road map image and a second map tile from an aerial satellite image, the two map tiles covering the area in which vehicle 100 is currently located. Image server 200 includes an image concatenator 220 that concatenates captured image #N and captured image #(N+1) to generate a first concatenated image, and also concatenates the map tiles of the road image and the aerial image to generate a second concatenated image. Image server 200 includes a feature extractor 230, which extracts first and second sets of features from the first and second concatenated images, respectively.

Image server 200 includes a feature concatenator 240 that concatenates the first and second sets of features to derive driving direction, driving lane, driving speed, driving course and steering angle for moving vehicle 100. Image server 200 includes an error estimator 250 that derives error ranges for the driving direction, driving lane, driving speed, driving course, and steering angle derived by feature concatenator 240, from the first and second sets of features. Image server 200 includes a path finder 260, which derives an accurate ground path of moving vehicle 100 based on driving direction, driving lane, driving speed, driving course, and steering angle derived by feature concatenator 240, including margins of error based on the error ranges derived by error estimator 250.

Figure 4:
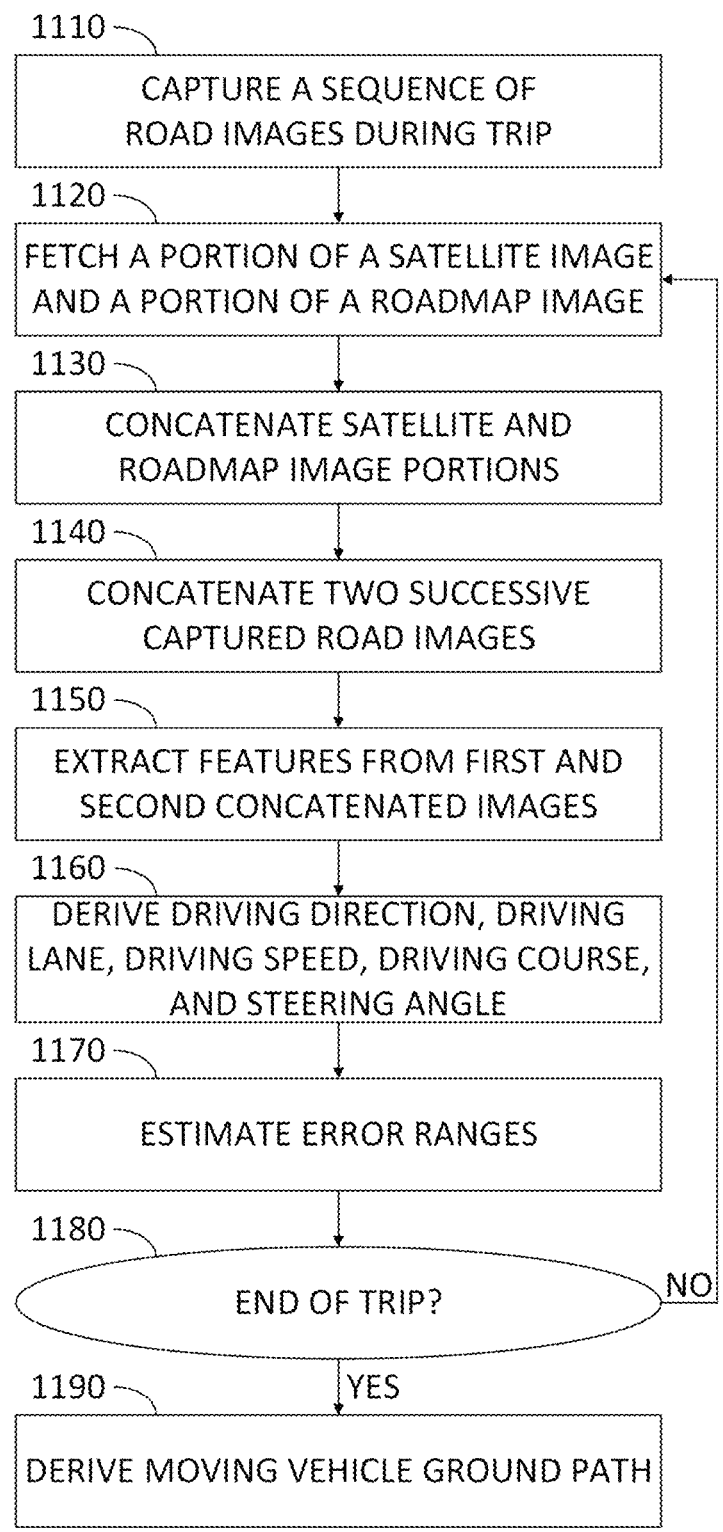
FIG. 4 is a simplified flowchart of a Snap2Sat path finder method for moving vehicles, in accordance with an embodiment of the present invention.

Reference is made to FIG. 4, which is a simplified flowchart of a Snap2Sat path finder method for moving vehicles, in accordance with an embodiment of the present invention. At operation 1110 dashboard camera 110 mounted in vehicle 100 captures a sequence of images during a road trip and uploads them to image server 200. At operation 1120 map fetcher 210, fetches a first image tile from a satellite aerial image, and a second image tile from a roadmap image, the two tiles covering a region where vehicle 100 is currently located.

At operation 1130 image concatenator 220, which receives the uploaded images, concatenates the satellite and roadmap image tiles. At operation 1140 image concatenator 220 concatenates two successive captured road images. At operation 1150 feature extractor 230 extracts features from the two images concatenated by concatenator 220. At operation 1160 feature concatenator 240 derives driving direction, driving lane, driving speed, driving course and steering angle of moving vehicle 100. At operation 1170 error estimator 250 estimates error ranges.

At decision operation 1180 a determination is made whether or not the end of the trip has been reached. If not, processing returns to operation 1120 to process a next leg of the trip. Otherwise, if decision operation 1180 determines that the end of the trip has been reached, then at operation 1190 path finder 260 determines the ground path of moving vehicle 100.

Figure 5:
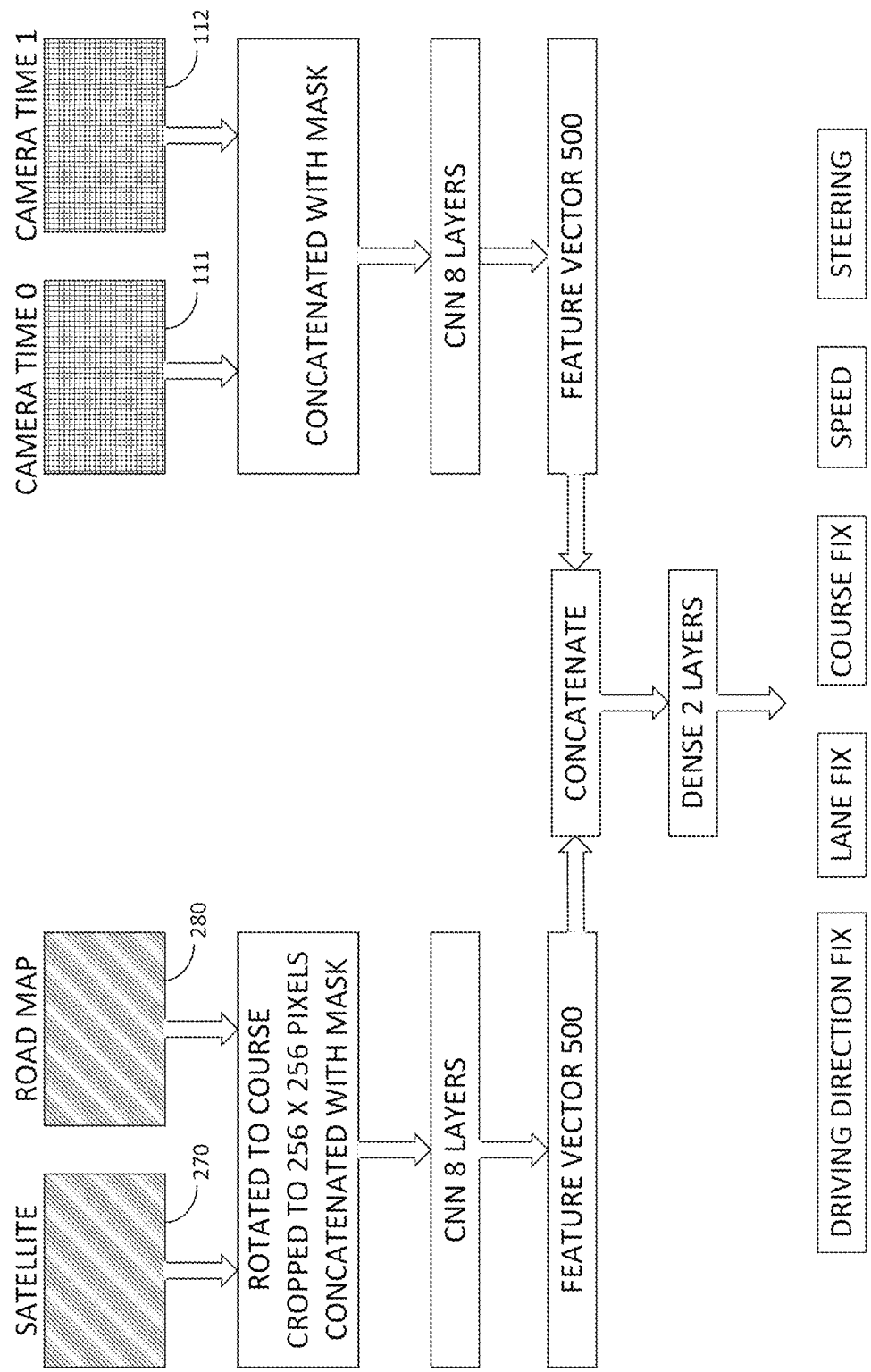
FIG. 5 is a simplified diagram of an architecture for a Snap2Sat model, in accordance with an embodiment of the present invention.

Reference is made to FIG. 5, which is a simplified diagram of an architecture for a Snap2Sat model, in accordance with an embodiment of the present invention. FIG. 5 shows an aerial/satellite map tile 270 and a road map tile 280 rotated to align with a course of moving vehicle 100. Map tiles 270 and 280 cover a geographic region in which vehicle 100 is currently located.

Figure 6:
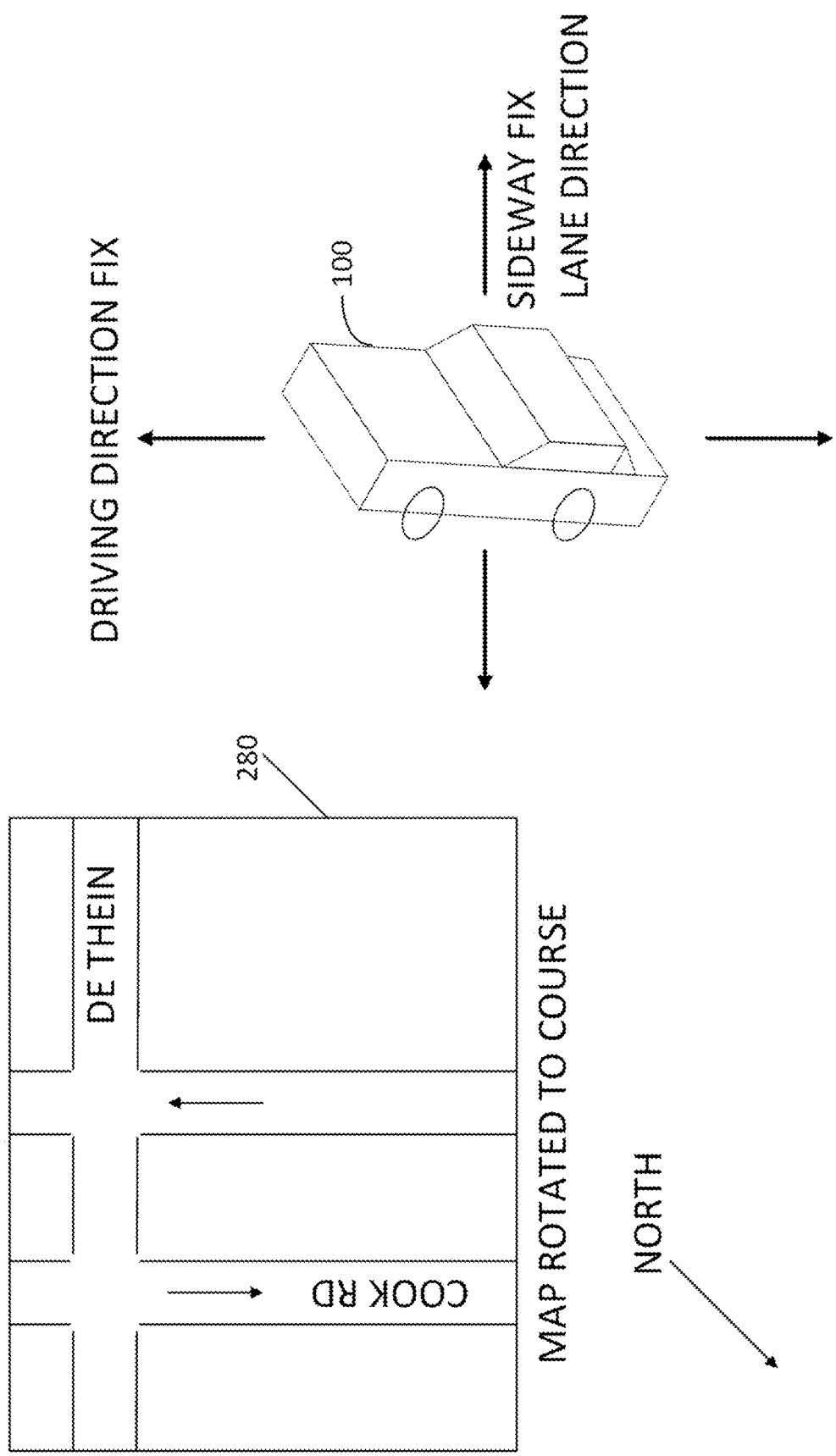
FIG. 6 is a simplified drawing showing a vehicle local moving coordinate system, including course direction and sideway direction, and a road map tile rotated to align with the vehicle course, in accordance with an embodiment of the present invention.

Reference is made to FIG. 6, which is a simplified drawing showing vehicle 100 local moving coordinate system, including course direction and sideway direction. Road map tile 280 is rotated so as to align with vehicle 100 course, in accordance with an embodiment of the present invention.

Referring back to FIG. 5, map tiles 270 and 280 are cropped to be of size 256×256 pixels, and concatenated with a mask. FIG. 5 also shows successive road images 111 and 112 captured by dashboard camera 110. The captured images are of size 256×256 pixels, and are also concatenated with a mask. Each of the concatenated images undergoes feature extraction by 8 successive convolutions, using a convolution neural network (CNN) with 8 layers. Each convolution reduces the image size by half in each dimension, so that the bottommost layer is a single pixel. The CNN generates feature vectors of length 500 for each concatenated image. The feature vectors are concatenated. Two dense layers are generated, from which driving direction fix, lane fix, course fix, speed and steering angle are derived.

As shown in FIG. 5, a SLAM model in accordance with an embodiment of the present invention takes as input:
1. a current captured image 112 from camera, 256×256 pixels;
2. a previous captured image 111 from camera, 256×256 pixels;
3. a previous location and course estimate, propagated to current time by previous speed and steering;
4. satellite imagery 270 of 50×50 meters from a current estimated location rotated to align course, 256×256 pixels; and
5. road map imagery 280 of 50×50 meters from a current estimated location rotated to align course, 256×256 pixels.

As shown in FIG. 5, the SLAM model is trained to take these inputs and predict as output:
1. Spatial displacement
   a. amplitude, regression (numeric prediction) in meters;
   b. amplitude classification—33 bins spaced using log scale; and
   c. directions—3 classes (left, no rotation, right).
2. Angular displacement
   a. amplitude, regression (numeric prediction) in radians;
   b. amplitude classification—33 bins spaced using log scale; and
   c. directions—3 classes (reverse, no rotation, forward).
3. Location fix in driving direction
   a. fix, regression (numeric prediction) in pixels; and
   b. fix, 33 bins, classification, linear about ±13 meters (±64 pixels).
4. Location fix sideways (in lane direction) in pixels
   a. fix, regression (numeric prediction) in pixels; and
   b. fix, 33 bins, classification, linear about ±13 meters (±64 pixels).
5. Course fix, how much is needed to fix the driving bearing/course
   a. fix, regression in degrees; and
   b. fix, 33 bins classification, linear ±8°.

There is a great deal of flexibility in training a SLAM model and the complexity is a function of compute and amount of training data. Alternative embodiments of the present invention include inter alia:
1. fully convolutional;
2. splitting each input to a different bunch (currently grouped by domain); and
3. deeper model.

In accordance with embodiments of the present invention, path finder 260 updates the predetermined satellite aerial image tile and the predetermined road map image tile based on the path of the moving vehicle derived by pathfinder 260.

In accordance with embodiments of the present invention, the updating by path finder 260 includes annotating points on the satellite aerial image portion of the road map image portion corresponding to vehicle location at approximately every second, and post-processing the annotated points to generate a GPS-like signal.

In accordance with embodiments of the present invention, error estimator 250 estimates individual error ranges, at each of the successive times, for the driving direction, driving lane, driving speed, driving course, and steering angle derived by feature concatenator 240, and determines an error margin for the path of the moving vehicle, by combining the individual error ranges.

In accordance with embodiments of the present invention, error estimator 250 combines the individual error ranges by (i) tracking location error in a vehicle coordinate system, (ii) transforming GPS fix to vehicle 100 local moving coordinate system, (iii) combining the transformed GPS fix with the tracked location error, (iv) adding a driving speed error to the location error in the vehicle 100 local moving coordinate system, by adding a first speed error component in the driving direction, and adding a second speed error component sideways to the driving direction according to an estimated error in course, (v) rotating the location error in accordance with the vehicle steering direction, and (vi) updating vehicle 100 location by transitioning from local and global fix, relative to a previous course estimate, using a current course estimate.

In accordance with embodiments of the present invention, the method of FIG. 4 updates the predetermined satellite aerial image tile and the predetermined road map image tile based on the deriving and the further deriving. Additionally, the updating includes annotating points on the satellite aerial image tile and the road map image tile corresponding to vehicle 100 current location at approximately every second, and post-processing the annotated points to generate a GPS-like signal.

In accordance with embodiments of the present invention, the method of FIG. 4 estimates individual error ranges, at each of the successive times, for the derived driving direction, driving lane, driving speed, driving course, and steering angle, and determines an error margin for the path of the moving vehicle, by combining the individual error ranges at the successive times. Additionally, the individual error ranges are combined by (i) tracking location error in a local moving vehicle 100 coordinate system, (ii) transforming GPS fix to vehicle 100 coordinate system, (iii) combining the transformed GPS fix with the tracked location error, (iv) adding a driving speed error to the location error in vehicle 100 coordinate system, by adding a first speed error component in the driving direction, and adding a second speed error component sideways to the driving direction in accordance with the estimated error in course, (v) rotating the location error in accordance with the vehicle steering direction, and (vi) updating the vehicle location by transitioning from local and global fix, relative to a previous course estimator, using a current course estimator.

Embodiments of the present invention provide a method for vehicle localization and mapping, including tracking GPS offsets, and aligning computed visual offset fixes to new uncalibrated GPS offset fixes, so as to compensate for changes in GPS offset fix.

Embodiments of the present invention provide a method for improving data collected from nodes where full localization flow runs off-line, by using manual annotation to fix location of vehicle 100 route using maps and a browser-based tool that stores annotations on a server for SLAM training and benchmarking, whereby users move a point in a vehicle route on the map according to time of the presented video, and whereby location between points is interpolated.

Figure 7:
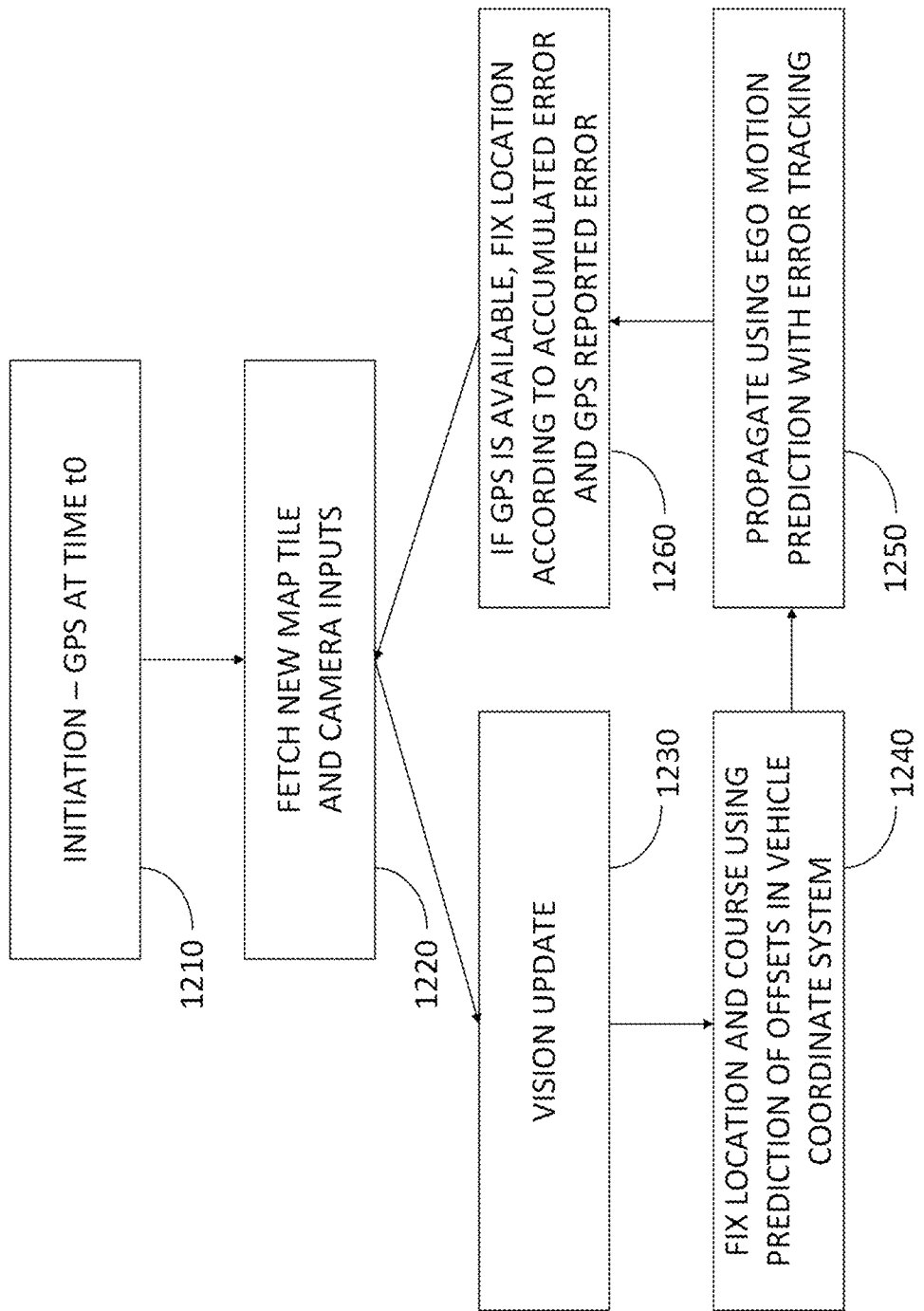
FIG. 7 is a simplified flowchart showing how to combine tracking results, in accordance with an embodiment of the present invention.

Reference is made to FIG. 7, which is a simplified flowchart showing how to combine tracking results, in accordance with an embodiment of the present invention. At operation 1210 localization is initiated to GPS at a time t0. At operation 1220 new map tiles and camera inputs are fetched. At operation 1230 a vision update is performed. At operation 1240 location and course are fixed using prediction of offsets in the moving vehicle 100 coordinate system shown in FIG. 6. At operation 1250 location and course fix are propagated using ego motion prediction with error tracking. At operation 1260, if GPS is available, location is fixed according to accumulated error and GPS propagated error. After operation 1260, flow returns to operation 1220 for successive processing cycles of operations 1220-1260.

In order to combine the results, the following operations are performed.
1. Tracking is done at 5 Hz.
2. Error and combining tracking data are done using the following model.
    a. Location error is tracked in the car coordinate system to allow the error to be rotated with car steering.
    b. Speed error estimation is added to location error in the car coordinate system, by adding it to the driving direction error, and another component sideway according to an estimated error in course.
    c. GPS fix is transformed to the car coordinate system, and combined according to tracked error.
    d. In updating location, the transitions from local and global fix are made using a course estimator, where fix is relative to a previous estimator.

In order to propagate the model, error estimation is performed. For example, error estimation may be performed according to histogram-based algorithm described hereinbelow.

Annotation Tool 140

To estimate localization, in addition to requiring a large collection of video and GPS data, high accuracy is also required. Conventionally this is performed using differential GPS (DGPS) with ground units. However, DGPS is not scalable and is not accurate enough in city areas. To provide accurate data, an embodiment of the present invention uses annotation tool 140 as described hereinbelow.

Annotation Tool 140 Flow:
1. An incident from a client application is uploaded with signals including GPS and other inertial sensors, such as accelerometer, from both dashcam and user phone, gyroscope and magnetometer.
2. A human reviewer views the video alongside a top view aerial image with a GPS route overlaid on it.
3. If the video integrity is good and the GPS signal is acceptable, the reviewer annotates on a map (mapbox tiles) the exact car location every second or at a higher rate on fast changes, such as street turns.

Figure 8:
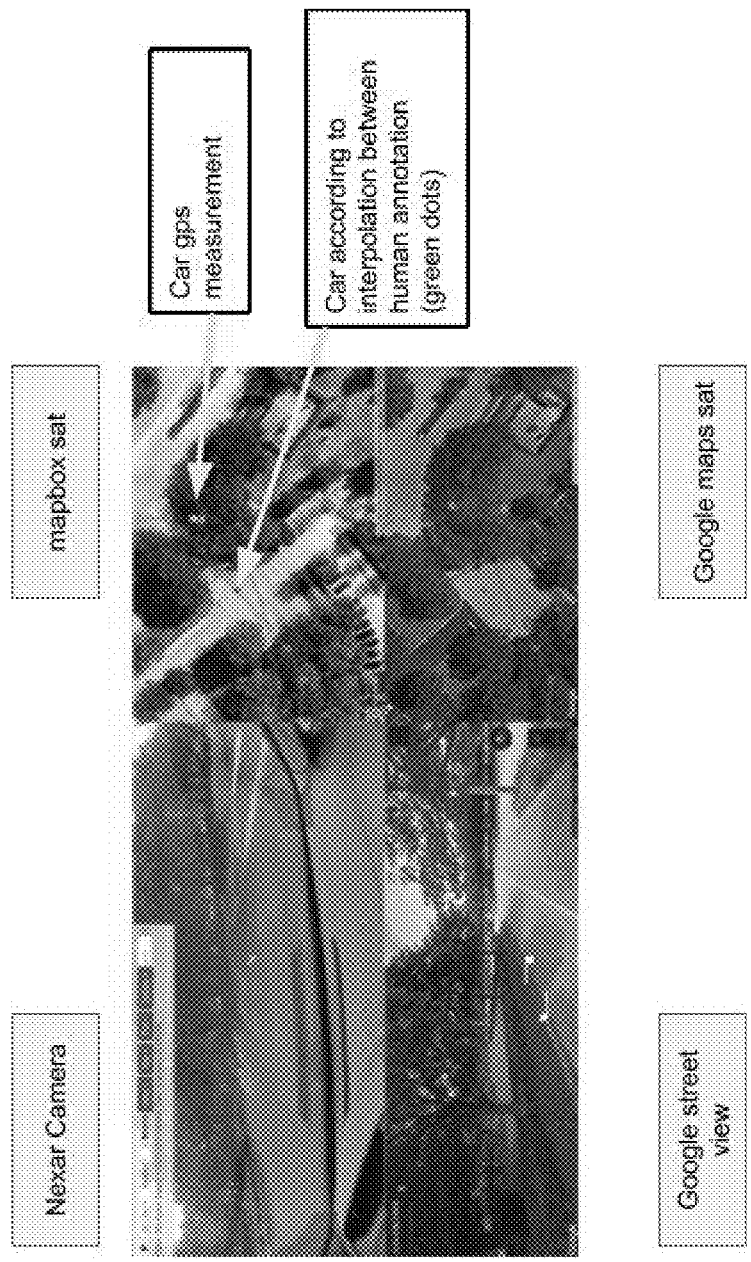
FIG. 8 is an annotation snapshot, in accordance with an embodiment of the present invention.

Reference is made to FIG. 8, which is an annotation snapshot, in accordance with an embodiment of the present invention. From the annotated points post-processing is executed to generate a GPS-like signal. In addition, the annotators themselves are also carefully selected after passing automated annotation tests by comparison to best experts. A dataset annotated at 1-3 meter accuracy includes 1,600 40 sec. incidents, and 250 collisions. The collisions are specifically annotated, to improve collision detection capability.

The Snap2Sat tracker runs in three modes:
1. blind—start with GPS point at the start of the incidents and continue based on ego motion and location fixes;
2. GPS-assisted—fuse with GPS readings, still real time; and
3. bi-directional—uses prediction in both directions of time and fuses results together.

Figure 9:
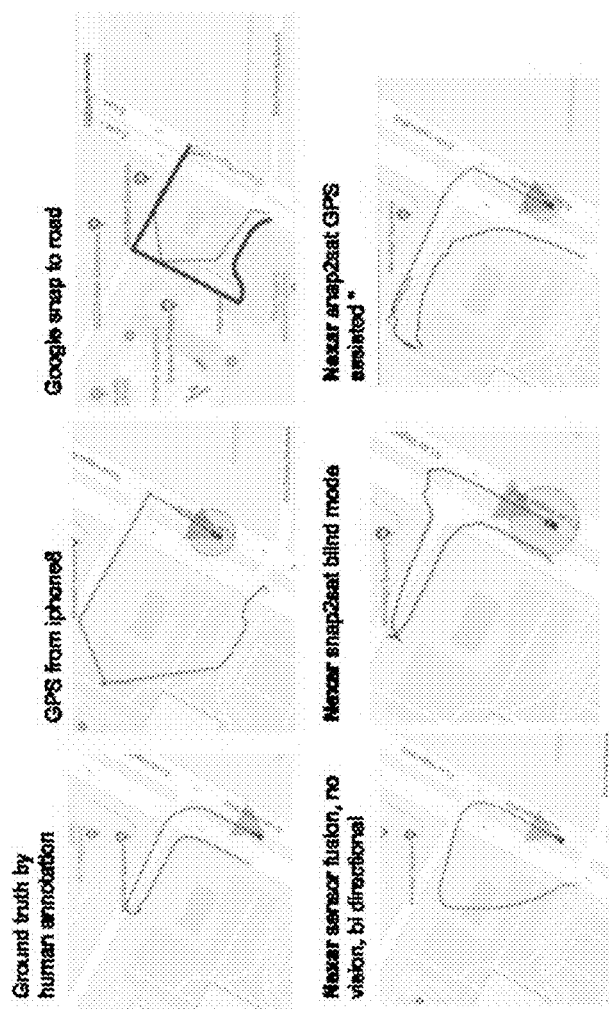
FIG. 9 is a comparative example of methods where GPS has severe error.

Reference is made to FIG. 9, which is a comparative example of methods where GPS has severe error.

In accordance with embodiments of the present invention, the SLAM model is trained on full route segments, such as 20 seconds of driving or more, instead of being trained on 2 frames from a camera.

Figure 10:
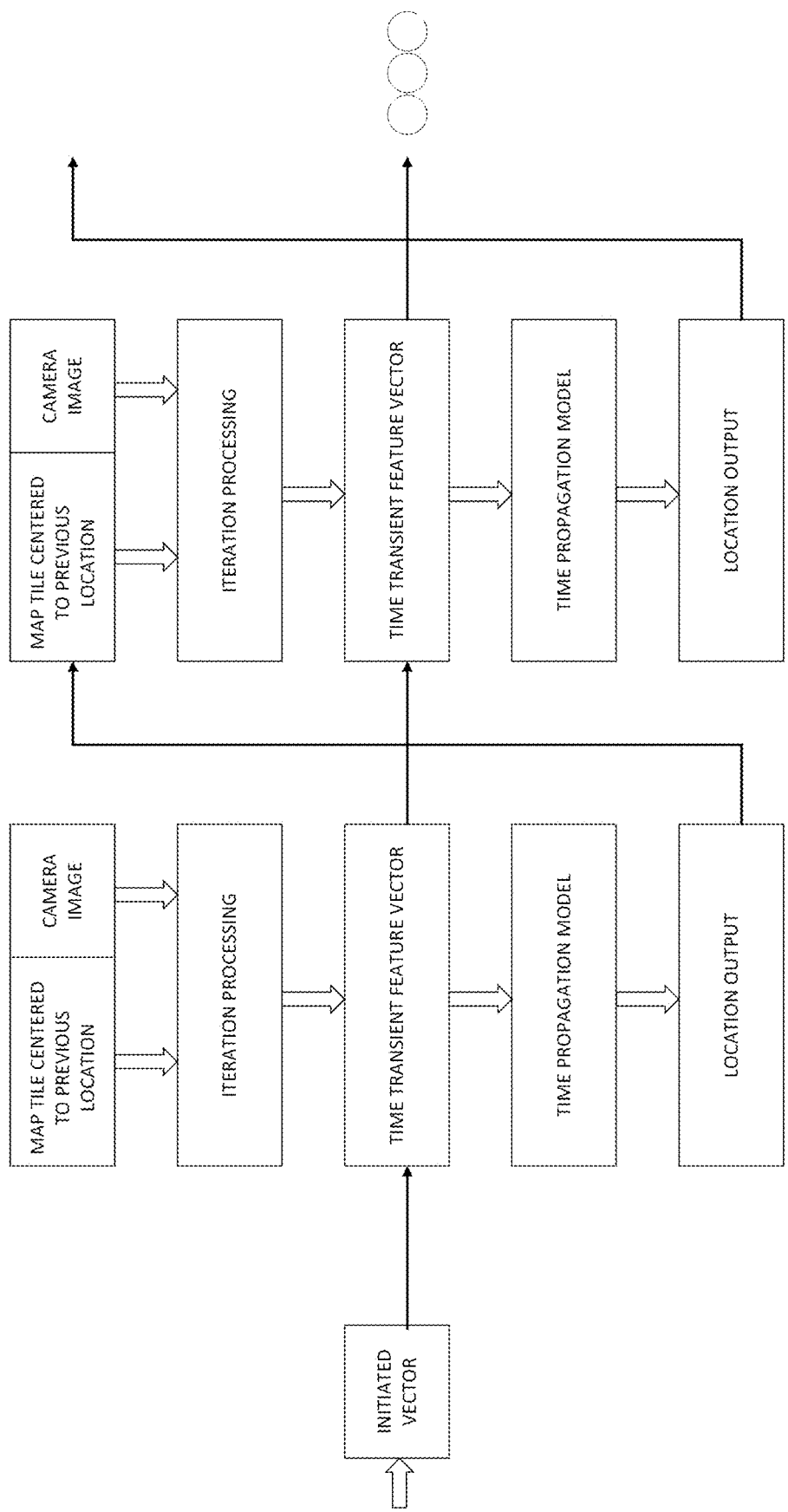
FIG. 10 is an example of a many-to-many recurrent model for Snap2Sat, in accordance with an embodiment of the present invention.

Reference is made to FIG. 10, which is an example of a many-to-many recurrent SLAM model, in accordance with an embodiment of the present invention.

Moving to Large Scale 2,000 40-sec. incidents provide good seed data for training a small model, say up to a few million parameters, but to improve generalization millions of incident videos are harvested. Dirty data with such vast size enables achieving a desired accuracy, if used with care. About 20-30% of the data is unusable, since GPS accuracy is 20-60 meter, but even in densely populated areas one has 5-10 meter accuracy 2-3% of the time. So balancing data across geographical areas enables use of much more data than human annotation.

Before actually training on dirty data, scaling is achieved by examining where the model is weak, by running high accuracy GPS incidents and seeing how well the model performs if the GPS data is augmented with error, or even run in dead reckoning mode only with an initial fix, selecting the incidents where the model fails, and moving them to annotation. Repeating this process uses the large dataset but does not overly bloat the dataset.

The benefit with dirty training is simplicity, and the ability to customize a model to a geographic region. Only the top 10-20% GPS signals are filtered by reported GPS accuracy with cross reference to actual distance from roads on map. The video to GPS time sync is then improved using ego motion from video, and only then the data for training is used. This allows 100× amount of data for training, but since the data is dirty the effective amount of data is around 10×.

From Self Localization to Mapping and Back

The full loop of SLAM includes both localization and mapping at the same time, in two forms; namely, (i) updating maps (aerial and roads), and (ii) generating additional layers using, for example, pre-trained detectors of desired artifacts (e.g., construction site zones, traffic lights). In an embodiment of the present invention, predefined objects are mapped by separate training, or by combination with a SLAM model. Detectors on the predefined objects provide a separate/combined dataset.
1. Training on image-based annotation:
    a. existing datasets;
    b. simple to build; and
    c. lacking time domain may result in shaky detection which is hard to use for distance and size evaluation.
2. Training on video annotation:
    a. more complex, no existing datasets; and
    b. allows much better training for detection over frames, and stability in distance and size evaluation.

In either case, detections are projected to a map by the following procedure.
1. Look at several detections over time (e.g., a bounding box over a traffic light);
2. Compute self-motion using Snap2Sat ego motion relative to the detections; and
3. Use camera calibration to compute the relation between pixel size changes and detection center motion in the image, for location and size of the detection on the map.

For a standard mobile camera, a simple pinhole equation is used; for a fisheye camera, and rectification is performed first.

Figure 11:
FIG. 11 is an example of bounding box detection and transformation to map domain according to ego motion and camera calibration, in accordance with an embodiment of the present invention.

Reference is made to FIG. 11, which is an example of bounding box detection and the transformation to map domain according to ego motion and camera calibration, in accordance with an embodiment of the present invention. The red line shown in FIG. 11 is a car route, and the red dots shown in FIG. 11 are detection locations on map where radius is physical size.

Once a local map is generated, an error per object is computed to allow aggregation of results. The error of object location is composed of self-localization error estimation, and relative localization of object error estimation.

Aggregation Flow:
1. Per video stream compute self-localization with given maps;
2. Detect desired objects and identify/track them using methods such as object similarity;
3. Compute object locations with error and representation vectors for further identification in the server (object similarity vector model may be trained independently); and
4. On the server, group same objects in a given area to create a hyper-accurate mapping.

Aggregate maps on the server are overlaid on top of the maps and fed to the Snap2Sat model, and retrained with it so as to have a full cycle of localization and mapping.

Generating/updating new layers of data ensures that aerial imagery is kept update/report outdated tiles. The SLAM model is trained to predict a tile of 20×20 pixels, for example, from a camera and make a loss function against the local tile. If the model fails to predict the results, there may be an error in self-localization, or an outdated map. This may be aggregated and, if it is a model problem, it may be sent for annotation, or if the map is outdated and the localization fix is accurate, it may be used to refresh the tile area.

Aggregation Flow:
1. Train a model on the client to classify the Snap2Sat model into up-to-date/outdated map at current location;
2. If outdated, send a frame on demand (FOD) from the camera with localization data;
3. Accumulate, from the clients, imagery of the outdated area;
4. Assign a probability to upload a patch, so as to have validation data on each section without a trigger;
5. Train a SLAM model to combine camera images and outdated tiles into an up-to-date tile:
   a. Use historic aerial maps to train such a model, old satellite maps train a model with camera imagery to predict the new tiles; and
   b. Train a model to complete a missing area ahead where this data is omitted from the tile and the model reconstructs it from dashcam imagery/video; and
6. The model of the aggregation on the server may run periodically or upon trigger with various amount of input imagery (may be trained to update pixels with one or with multiple images). If running iteratively, the updated map is reused as the old map, and update is done up to a per-image level.

Building Special Road Maps for Snap2Sat

Even with current operating data, based on an open street map and a mapbox, more suitable maps for car vision navigation are built with unneeded data removed, including inter alia symbols for points of interest which are not visible, ship routes, and air routes.

Figure 12:
FIG. 12 shows how other visible features are added, in accordance with an embodiment is the present invention.

Reference is made to FIG. 12, which shows how other visible features are added, such as building height in logarithmic scale, in accordance with an embodiment is the present invention. FIG. 12 shows how building height is used in a red channel, train routes are yellow, pedestrian routes are blue, and car routes are purple.

Low-Dimensional Maps for Localization on Client

When running localization on client maps, size is minimized so as to allow local storage on the client for offline work, and to reduce bandwidth data consumption. Another benefit is reducing compute time by about 30%. This is achieved in the training process of a SLAM model, where the architecture of the model receives map inputs as width×height×channels input, and encodes it to an n-parameter feature vector. Since the feature vector has no dependence on car location, it may be pre-processed for entire geographical areas and reduce map size at a given zoom level by about 2-3 orders of magnitude, depending on the client-side desired accuracy. This can be combined with update logic, whereby client and server communicate in real time and fetch updates over a cellular network.

Sensor Maps

An inertial sensor may be used in the SLAM model to improve ego motion prediction, and in the tracker level using a Kalman/particle filter with conventional dead reckoning methods.

As additional map layers: GPS and vision localization are used to add "hidden" map layers.
1. Magnetometer—Generate areas with high magnetic interference to aid localization at night, e.g., under or on of top power lines and other electrical infrastructure (also known as hard iron interference) and when passing under iron infrastructure or magnetic infrastructure which may distort the earth's magnetic field (soft iron interference);
2. Accelerometer—Create road quality maps, potholes, speed bumps and other features, using gravitational approximation to create a road inclination map;
3. Gyroscope—same as accelerometer, plus the ability to better determine curvature of roads; and
4. Wi-Fi/BLEi signals—map Wi-Fi and Bluetooth hotspots signals into the feature vector of a satellite tile.

Image Similarity Using Low-Dimensional Embedding

Goal: fine-grain classification for real world localization.

Solution: map every corner of the street in a database, and retrieve the corners from the database from a photo of the street localized in a range of 10 m using image similarity.

Triplet Network

Another component of the SLAM system is a network that provides embedding, so that two images taken from close-up (say up to 10 meters, and with difference in course of up to 20°) are also close in the embedding space. The embedding space is a vector space, and closeness is measured by Euclidean distance and its proxy-cosine similarity. Creation of a proper embedding space is performed in an unsupervised manner using a triplet network, as described in Hoffer et al., "Deep metric learning using triplet network", *International Conference on Learning Representations* (*ICLR*) 2015. Then the datasets for training the triplet network are generated as follows: "Good" time lapse videos are used, namely videos which have a consistent GPS signal, of accuracy under 10 meters; and individual frames from the time lapse videos are then grouped into bins according to two possible policies:
1. A grid of K×K meters (e.g., 10×10); and
2. A buffer of width K around each segment ID for all segments in an open street map (OSM).

Figure 13:
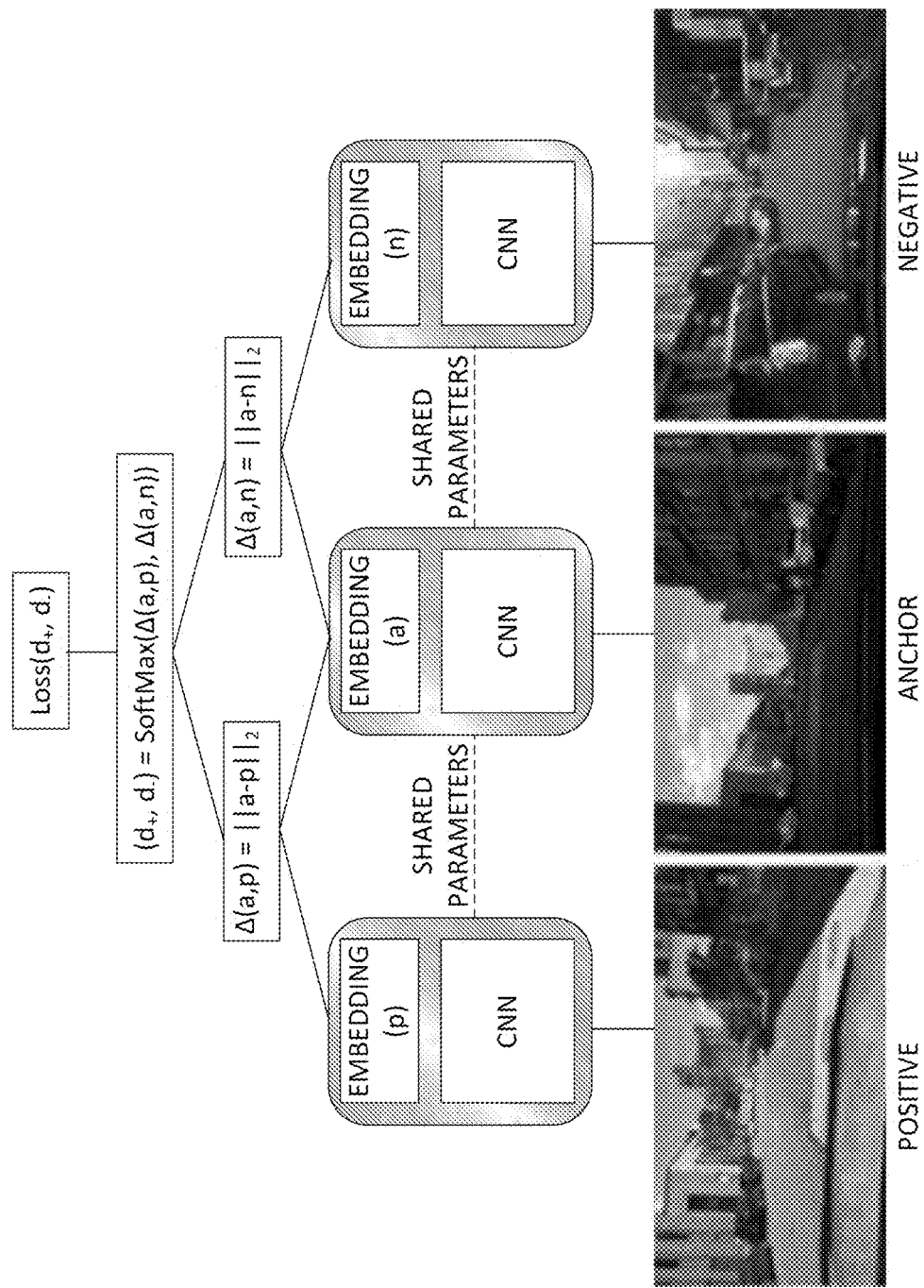
FIG. 13 shows a triplet composed of an anchor, a positive image and a negative image, in accordance with an embodiment of the present invention.

Once the bins are populated, training the triplet network begins by feeding it triplets of images. Reference is made to FIG. 13, which shows a triplet composed of an anchor, a positive image, and a negative image, in accordance with an embodiment of the present invention.
1. An anchor—images sampled randomly from a randomly sampled bin;
2. A positive image—an image from the same bin that is within a distance <10 m from the anchor image; and
3. A negative will be selected by sampling from three different populations:
   a. Far Away—frames with distance of >100 m and/or course >90°;

b. Far—frames with distance 30-100 m; and c. Far-Close—frames with distance 30-40 m.

Figure 14:
FIG. 14 is an example of a triplet of images, in accordance with an embodiment of the present invention.

Reference is made to FIG. 14, which is an example of a triplet of images, in accordance with an embodiment of the present invention.

Using a vast amount of data, the distance between the anchor and the positive image is added. In this case, a head for computing distance between two images is added to the network.

Indexing the World

For all good frames spread evenly over the map with distances of <10 m apart, an embedding vector is computed and stored in an indexed database as a document, along with its precise GPS coordinates. The indexed frames are referred to as "keyframes".

Given a query frame composed from an image and GPS coordinates, search for a similar image in the database. The image is restricted to a large radius, e.g. around 500 meters, and the results returned are ranked by cosine similarity. To determine a corrected GPS position, a weighted sum of the K closest keyframes is used. The weights are based on cosine similarity and optionally also on distance between the keyframes and the query frame, when using the variant of the network that computes distances.

The set of triplet images may be constructed from sufficient time lapses, where accuracy is under 10 meters. However, accuracy of the predicted locations of the images still suffers from all time sync errors in image acquisition. Here Snap2Sat comes into play. Since this algorithm uses dynamics of the time-lapse ride, it eliminates these time sync errors and provides very good accuracy of 1-3 meters with a good estimate of the course. In this way an accurate dataset for training of the triplet network is generated automatically, without human intervention.

The motivation is to have a network that does more than providing an indication that two images are similar. The traditional multi-view triangulation methods are replaced by a network operative on a collection of a number of embedding vectors of similar images.

There are several embodiments, inter alia:

1. Train image similarity using a triplet, and use the embedding vector of multiple images to train another model to extract relative displacement, and anchor to the anchors;
2. Instead of similarity training, train the embedding vector to optimize distance from image, image to image displacement and rotation; and
3. In the triangulation method use multiple vectors that are in proximity. This is performed using either:
   a. fixed input; or
   b. recurrent model.

Human annotation provides a benchmark, as described hereinabove for SLAM. "Dirty data" is used for training, similar to what is done in other cases.

Figure 15:
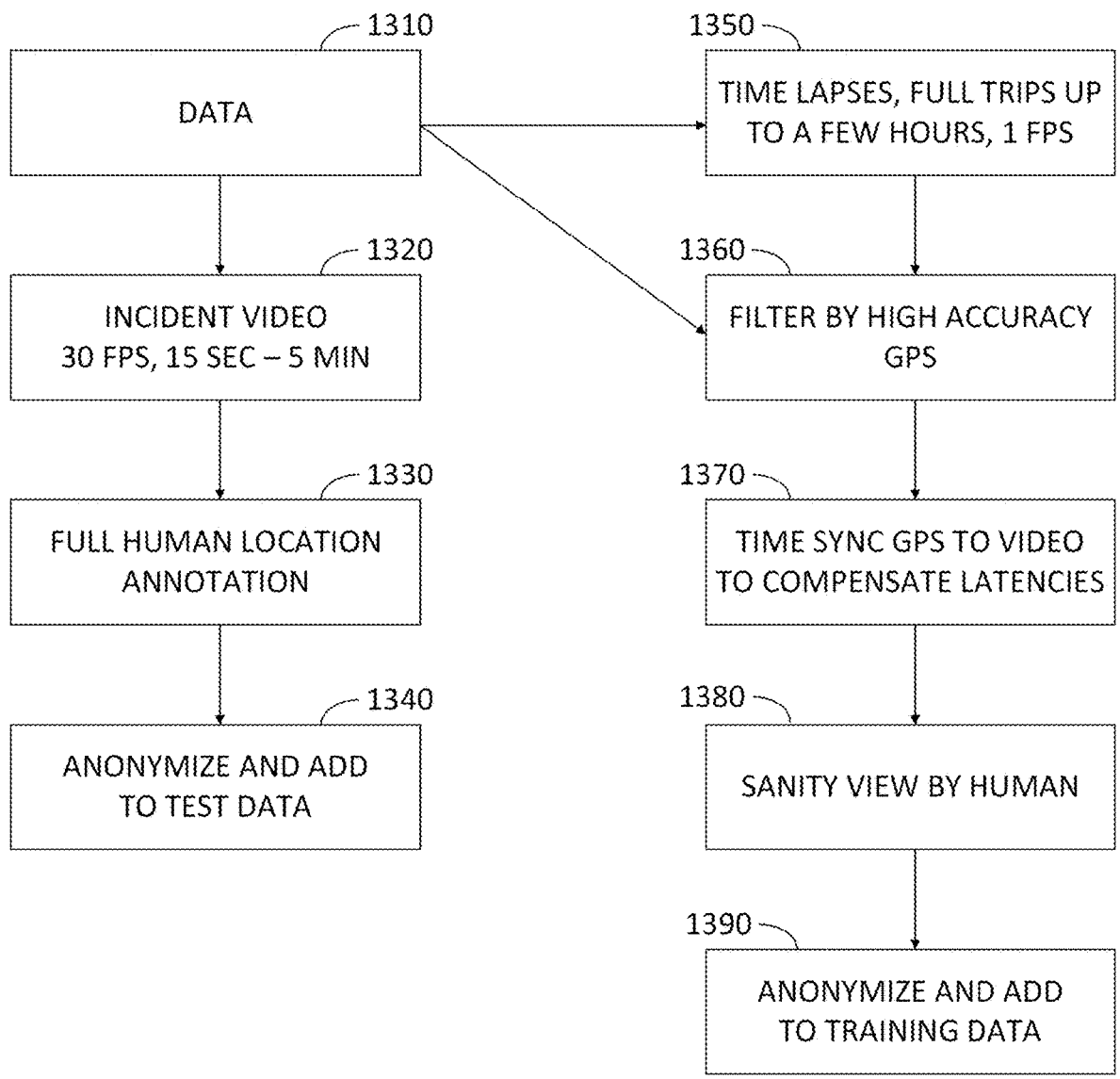
FIG. 15 is a simplified flowchart of generating and training a dataset, in accordance with an embodiment of the present invention.

Reference is made to FIG. 15, which is a simplified flowchart of generating and training a dataset, in accordance with an embodiment of the present invention. FIG. 15 shows test data 1310 corresponding to incident video 1320, captured at 30 frames per second, for a time duration of 15 sec-5 min. Location annotation is performed manually at operation 1330, and the annotation is added to test data 1310 anonymously at operation 1340. FIG. 15 further shows time lapse video 1350, for a full trip lasting up to a few hours, at 1 frame per second. At operation 1360, test data 1310 and time-lapse video 1350 is filtered by high-accuracy GPS. At operation 1370 the GPS data is time-synced to video 1320, to compensate for latencies. At operation 1380 a human views the time-synced video for a sanity check, and at operation 1390 the time-synced video is added to the training data anonymously for the SLAM model.

Frames are generated for placement in a geographic tile of predefined volume, where each image has metadata to compute "distance" in the label space:

1. course;
2. latitude;
3. longitude;
4. altitude; and
5. time of day.

Each of the values is normalized to allow proximity evaluation.

In the training process an image is selected and an embedding vector is computed with shared weights to other images that provide a desired location where the location/labels of the image is hidden to the model and the others are visible. The model predicts the labels and in the process trains all of the embedding vectors.

The labels of the images and the image under training may be augmented to improve the robustness of the model. As described hereinabove, prediction may be run only on stored embedding vectors, to achieve faster execution.

After the initial phase of the multiplet, the feature vector of multiple images is fused to one feature vector, by running another phase where multiple embeddings in confined areas are forced to one vector and re-trained. In this embedding the satellite map and road map may be integrated as additional images.

Methods Integration—Search and Track

While the Snap2Sat method is localized and based on small fixes, from 15 meter error to 1-3 meters, image similarity is trained to generate a more global localization fix method, but is more restricted in dynamics and high accuracy.

A combined method may proceed as follows.

1. When error is large, use an image search method;
2. When error is small, track location with snap2sat; and
3. When Snap2Sat error diverges or a large disparity between GPS and Snap2Sat arises, use an image search method again.

This achieves:

1. Lower use of GPS to save power, activate only upon divergence; and
2. Use of only cellular fix and actively using image similarity and Snap2Sat.

Ultimate localization is achieved when all available information is combined. One method of doing this trains a model that takes as input both map and imagery from the road captured by other vehicles/sources and labeled with position and course, to generate a combined embedding representation before being used for full localization (not just similarity, but actual distance fix in meters, ego motion). The combined embedding may be computed in advance in the server.

Model Training Flow:

1. By augmented offset, select a map embedding level (zoom level) and feed the model with given map pixels and a set of images with labels that cover the area (spacing gets denser by zoom level);
2. Another batch of input is a current image or a set of consecutive images from the camera;
3. The map is offset the center from the ground truth and the model predicts the offset; and
4. The embedding layer of the map and existing imagery is saved per geographical area at multiple zoom levels, for real time use in the client.

The above mapping and localization method provides a full end-to-end method, where the map itself is part of the trained network as the anchor of a multi-channel auto generated map.

Figure 16:
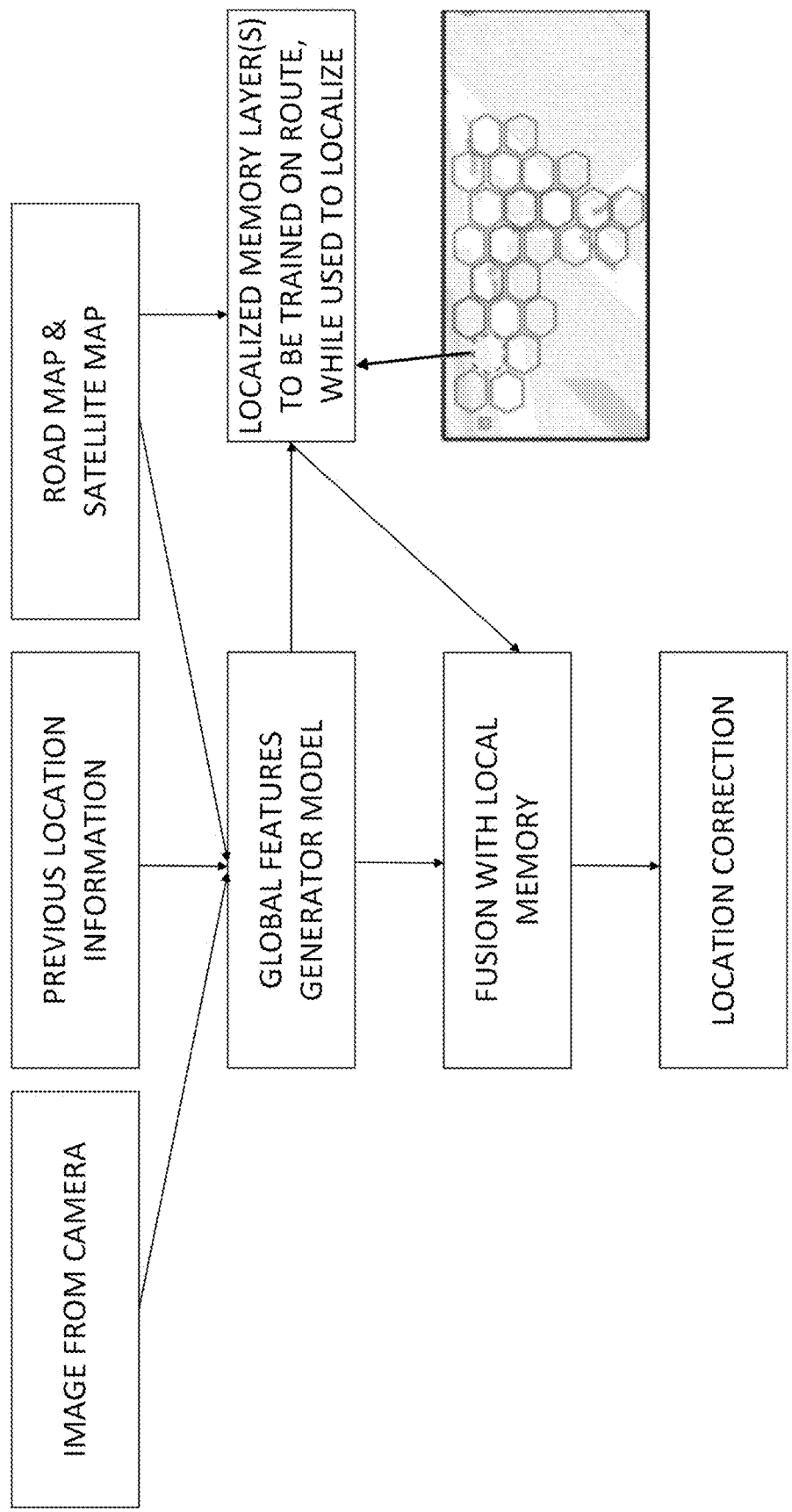
FIG. 16 is a drawing showing that, per location, a dedicated part of the model is loaded, updated and saved back to the server as needed, in accordance with an embodiment of the present invention.

Reference is made to FIG. 16, which is a drawing showing that, per location, a dedicated part of the model is loaded, updated and saved back to the server as needed, in accordance with an embodiment of the present invention.

In this method the model is trained on multiple locations, whereby global and fusion blocks are trained in all locations but localized memory layer is per geographical cell. This method is especially applicable to areas where large amounts of data are available, to allow full optimization when the memory layer has constant input and output size but flexible "memory" cells, if using a simple dense model, or any other type of architecture to fully utilize the amount of data, or multiple models to also enable optimization on bandwidth and compute per edge client use case.

The main differentiator to the triplet method is that the memory stores weights instead of activations, allowing for specialization and flexibility. An alternative method uses a model that takes the output and generates a localized embedding vector of activation, where the anchor is the map instead of an image.

To avoid having to store imagery and only train and keep the memory cell, a similar approach to the triplet method is used, where segments with high accuracy GPS are taken and a current frame is used as an anchor to previous frames, thereby learning distance of one cell from the other. For example, 5×5 meter cells when car is driving 10 meter/sec and frames 2 seconds apart may train cell a to learn distance to cell b. Cells are separated by course, longitude latitude and altitude to allow visual grouping.

Road View Mapping and Localization Using Object Identification

Figure 17:
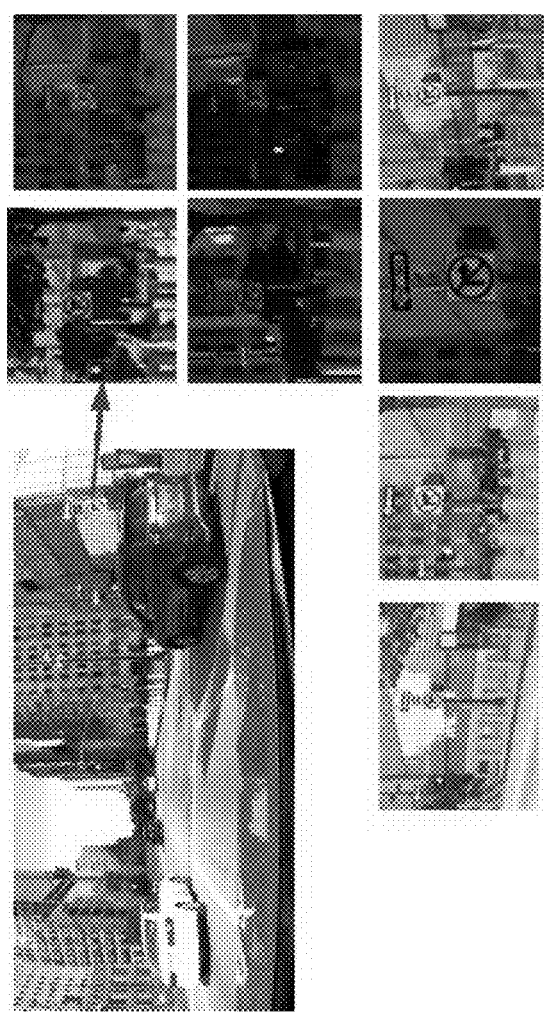
FIG. 17 is a series of photographs showing how to identify objects, in accordance with an embodiment of the present invention, in accordance with an embodiment of the present invention.

Reference is made to FIG. 17, which shows how to identify objects, in accordance with an embodiment of the present invention. FIG. 17 demonstrates the system capability of identifying an individual traffic sign where an initial localization is derived from GPS and pinpointed by the visual context of the sign.

Similar in approach to image similarity, is similarity in the context of object detection where the context of the full image is used with bounding box around objects, whereby the model is trained against two types of annotations between images:
1. Classification—Is type/class of the object is the same; and
2. Tracking—Is this the same object, identification of same object across sequence in a video and between rides.

Each of the tasks has a different goal where classification provides mapping and context for navigation and search capabilities. Identification provides self-localization using those objects and, not less important, tracking over time of objects on the road.

There are inter alia two ways to train a model for this system:
1. Existing datasets for traffic signs/lights, for example, such as bdd 100 k (Berkeley annotations based on data) which allows building basic bounding box detection on an image:
   a. Run detector and classifier on time lapses and incidents to gather artifacts, and aggregate using GPS where with track object using tracking of multi-view produced using ego motion and camera calibration; and
   b. Use similarity to given set of traffic signs and other objects embedding vector; and
2. Specially annotated dataset generated on videos where object identity is generated and type is classified by human annotator.

Aggregation of such detection is simple due to similarity using the context of the bounding box detector. What was once only a class is now an embedding vector allowing identity detection, and tracking condition of objects over time. The system generates and refreshes a map indicating changes of object and updates the embedding vector state over time.

For self-localization physical properties of the objects (size, orientation and exact location) are calculated as follows:
1. Using multi-view geometry from ego motion generated from the video, accelerometer, gyroscope and GPS, with the detector combining the bounding box changes due to relative motion, distance, size and angle to the camera of the detected object are computed;
2. Combining the previous with known priors on sizes of classified objects; and
3. Aggregation of the physical properties over time.

Once the properties and identities of each object are known, the changes of the bounding boxes of each object project onto the location and dynamics of the viewing camera.

Example of the System Usage in a Municipality or Exploration by User

1. Track a stop sign in an intersection over a long period;
2. At a certain date a sign fell due to bad weather conditions;
3. Detect that an object is missing and send an alert to the city services;
4. City workers open a site view and obtain frames of the object across periods of time where the object is missing, with information about the time of event and location on the map; and
5. The city dispatches a fix.

Physical Error Estimation from Classifier Distribution

Deep learning is transforming the way estimation is performed in the algorithmic domain. Based on raw data and labels, supervised models are trained to output estimates for almost any task done by humans. For classification tasks with softmax activation in the output layer, a confidence estimation is obtained, e.g., how likely it is a cat or a dog; but on regression problems (typically linear/identity activation) only a number is obtained, for example speed output for 2 sequential images as input. For many real-life tasks, getting only a numeric output evaluation is not sufficient. In order to be able to use model prediction for higher level algorithms, such as Kalman or particle filters, a physical error estimation for the physical measurement generated by the model is desired, e.g., for speed, value in meter per second and error estimation in meter per second is desired.

The initial step is to train not only the regression to obtain the physical measurement estimation, but to also train bins "one hot" label that is set by proximity to the physical estimation. In doing so, it is assumed that a desired measurement has some smooth continuous nature and is increasing/decreasing without singularities, such as speed, steering, temperature or almost any day-to-day physical measurement.

It is advantageous, depending on the domain of the problem, to have a non-linear spacing of bins to allow proper error estimation both in small and large values. For speed, 0.1 to 100 meter per second is used to cover most human speeds (from slow walk to fast car). Then use logarithmic scale with desired bins.

In summary:
1. Take the measurement under interest and consider the values range;
2. Generate bins with desired size where separation is smaller than prior knowledge of error at those values, such that bin spacing is smaller than error;
3. Use nonlinear spacing (e.g., log scale) if a property contains both small and large values, to avoid high count of bins;
4. Create one hot label from the numeric label; and
5. Train both regression and classification with mean absolute error and cross-entropy losses.

At this stage there are two outputs; namely, continuous value estimation and a list of classes representing result ranges with confidence. One may stop here and provide a confidence of the bin representing the regression result. However, it is possible to achieve error estimation with proper physical values, as follows. Decide which cumulative distribution function (CDF) work point of confidence is chosen to show error. Common values are 1 or 2 sigma (CDF of 0.68 and 0.95 accordingly).
1. Cumulatively sum the bins;
2. Interpolate the physical value of the selected error work point on the confidence domain (with "x" as the CDF values and the bins center as "y");
3. Reduce the regression results from the value and obtain the positive (right side) error range; and
4. Repeat 1-3, but with reverse cumulative sum to obtain a negative error estimation.

At this stage a +/−error range is obtained, with physical units for nonlinear bin spacing of physical measurement estimation.

The need for speed estimation is clear and also for error estimation, since proper estimation enables integrating measurements and fusing them with other measurements, such as acceleration sensor data, to produce even better results.

Figure 18:
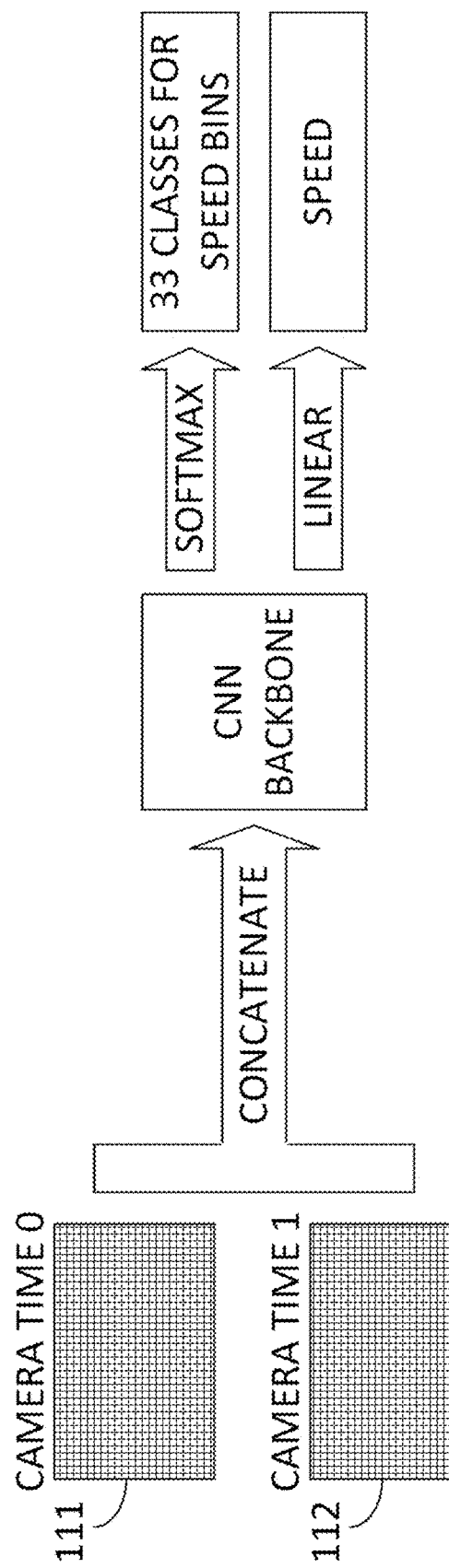
FIG. 18 is a simplified drawing showing an architecture for a speed estimation model, in accordance with an embodiment of the present invention.

Reference is made to FIG. 18, which is a simplified drawing showing the architecture of a speed estimation model, in accordance with an embodiment of the present invention.

Since the domain is car speed, and the frame rate is, e.g., from 5 fps to 1 fps (time-lapse), distance is used instead of speed to label and train the model. Subsequently division by time step generates speed. Since a typical car may reach 70 meter/sec (156 mph, 252 kph) but may also drive 1 meter/sec, the range is 0-70 meter/sec, if driving in reverse is ignored. Since error typically increases with speed, logarithmic bin spacing allows bin resolution to also fit small displacements, and at a frame rate of 30 fps the smallest displacement of interest at is 1 meter per sec/5 Hz=0.2 meter and the largest displacement of interest is 100 meter sec/1 Hz=100 meter.

Using linear spacing for a range of 0.2-100 meter with 0.1 resolution at the low end requires more than 2000 bins, which in turn requires a large number of parameters in the last model layer, which converges very slowly and requires much more data. To overcome this, bins centers are selected according to the following formula: numpy.logspace (start=0, end=2, desired bin count=33)−1. This results in the following centers:
[0., 0.15, 0.33, 0.54, 0.77, 1.05, 1.37, 1.7, 2.1, 2.6, 3.2, 3.8, 4.6, 5.5, 6.5, 7.6, 9, 10.5, 12.3, 14.4, 16.7, 19, 22, 26, 30, 35, 41, 47, 55, 64, 74, 85, 99]

Generating the one hot is simply proximity to bin center, and both the regression and the classification are trained. Propagating the model completes the model. Prediction is run, using a set of float values from a regression representing displacement in meters and a batch of 33 bins representing confidence.

Figure 19:
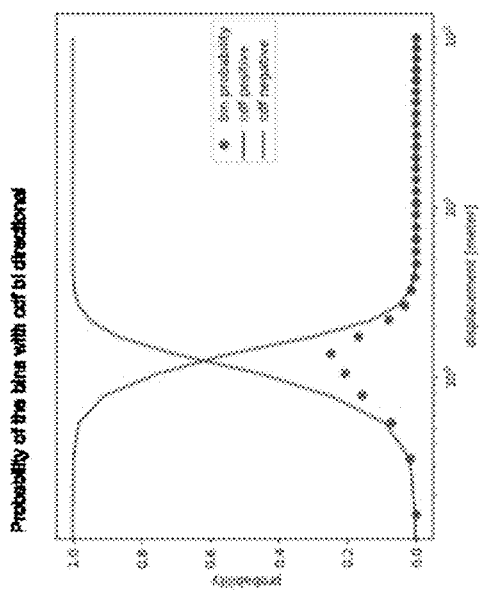
FIG. 19 is a drawing showing bi-directional cumulative distribution functions of bin probabilities, in accordance with an embodiment of the present invention.

Reference is made to FIG. 19, which is a drawing showing bi-directional cumulative distribution functions of bin probabilities, in accordance with an embodiment of the present invention.

FIG. 19 shows that the intersection of the cumulative distribution function (CDF) from both sides provides the most probable value in this example. Additionally, to obtain an error estimate, the value at the point of CDF=0.68 is interpolated for a one-sigma error representation.

Figure 20:
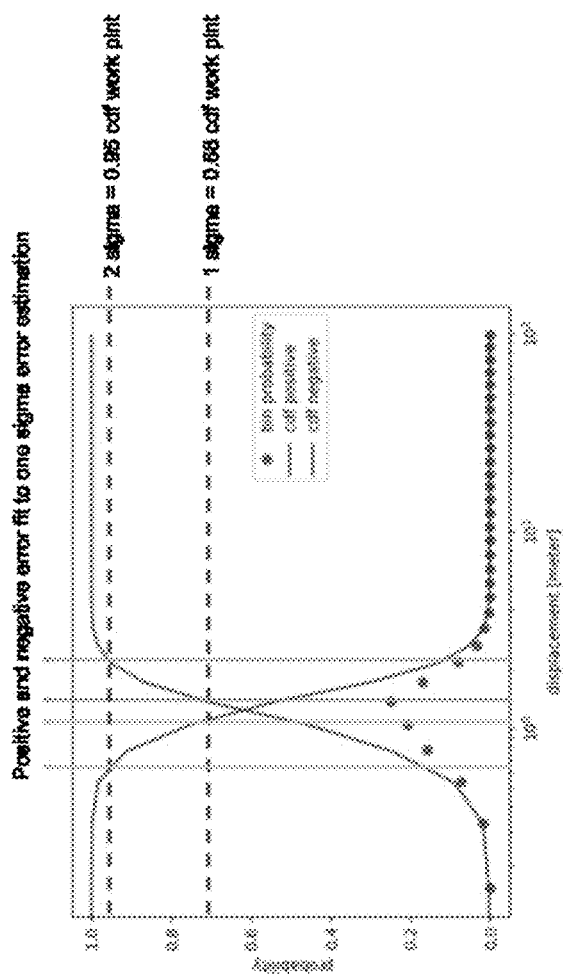
FIG. 20 is a drawing showing positive and negative error fits to one-sigma error estimation, in accordance with an embodiment of the present invention.

Reference is made to FIG. 20, which is a drawing showing positive and negative error fits to one-sigma error estimation, in accordance with an embodiment of the present invention. This provides +−asymmetric error estimation. If only a radius of error is required, maximal error is selected.

Figure 21:
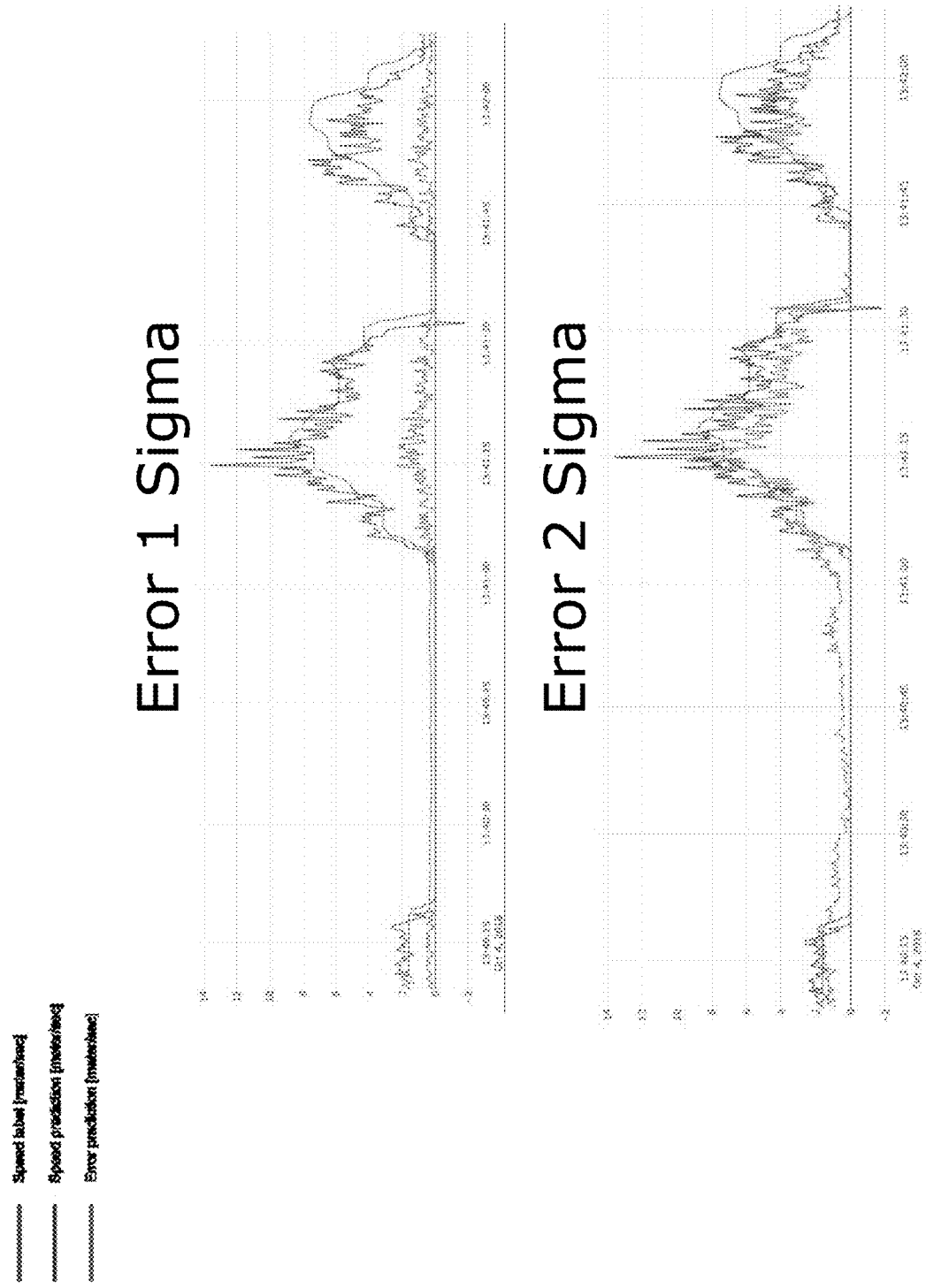
FIG. 21 is a drawing showing Snap2Sat results in the time domain, in accordance with an embodiment of the present invention.

Reference is made to FIG. 21, which is a drawing showing the results in the time domain, in accordance with an embodiment of the present invention.

Vector Mapping of the Road Features

While the methods described hereinabove provide a solution for the problem of self-localization and mapping, they do not provide results that are always explainable to humans and may be simply aggregated to other uses. To enable this, a lane level road markings annotation by humans is used to generate a semi supervised system for vector map features generation.

Figure 22:
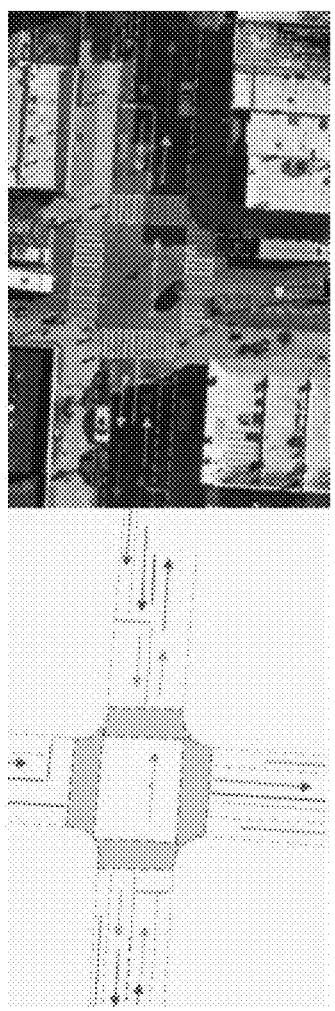
FIG. 22 shows an aerial map, sections of which are annotated to train a model and generate features for the entire map, in accordance with an embodiment of the present invention.

Reference is made to FIG. 22, which shows an aerial map, sections of which are annotated to train a model and generate features for the entire map, in accordance with an embodiment of the present invention. The top image of FIG. 22 shows an annotation system with annotations for lanes, crossroads and other road markings.

In a second phase the system generates, on the servers, a full vector representation of a full map, e.g., of a city. Each area and each individual vector feature has a confidence level that is used for an active learning sub-system where a human reviews the results and if needed, fixes them. The reviewed areas are added to the model training data or testing data for further enhancement of the accuracy of the models.

Figure 23:
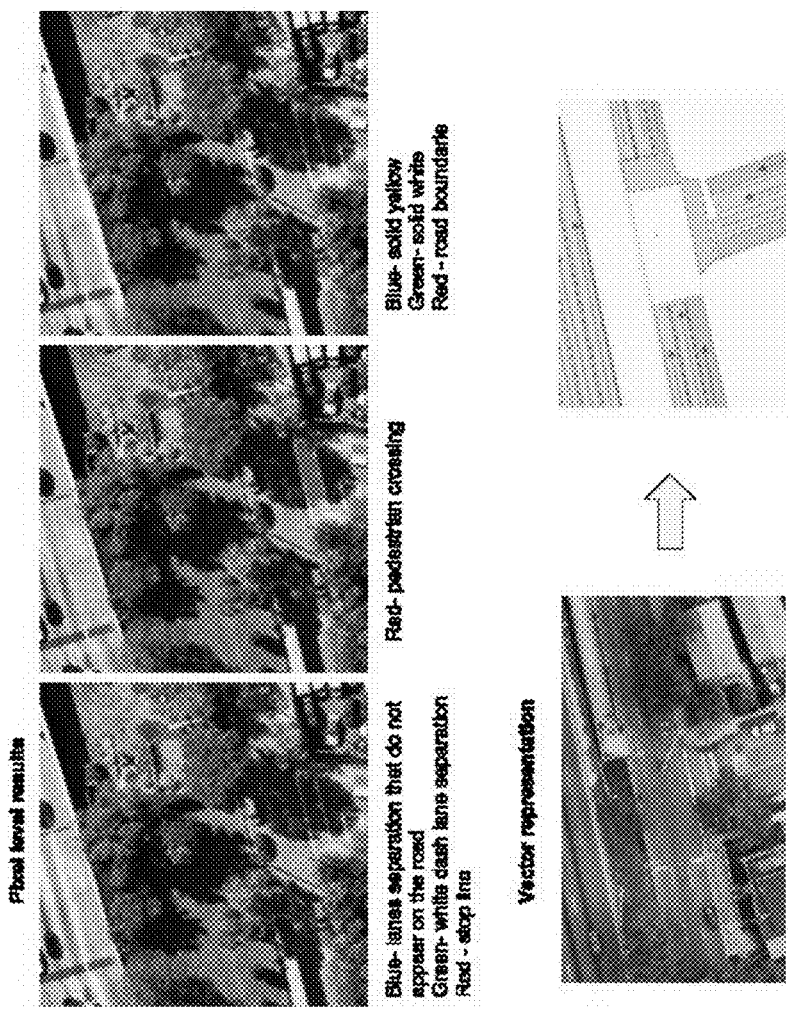
FIG. 23 shows an aerial map, sections of which are annotated to train a model and generate a vector map, in accordance with an embodiment of the present invention.

Reference is made to FIG. 23, which shows an aerial map, sections of which are annotated to train a model and generate a vector map, in accordance with an embodiment of the present invention. The transition from raster tiles to vector representation includes optional pixel level segmentation which may be used, instead of a raw satellite map, for schematic view of the map and for Snap2Sat self-localization.

The top view images are typically 1-3 years old, and there are partially hidden parts due to tall buildings and angle of image, and completely hidden parts due to tunnels, top roads or even trees. There are several ways to overcome these drawbacks.
1. Imagery from the road dashcams is automatically generated using an FOD/VOD triggering system whereby areas with low accuracy maps fetch maps from ground level nodes. This is initially used for manual update.
2. Creating a sparse vector representation on the client side or offline on the server side, and using this with multiple driver aggregation to automatically generate hidden areas lane level maps.

3. Using a SLAM method to generate pixel level top views of the areas hidden, up to tunnels where ego motion/dead reckoning is used, and then applying the same method used to extract the features from standard top view/aerial imagery.
4. Tile freshness alert may be generated from client nodes where road features do not match the sparse map fetched from the server.

The sparse lane level/road marking may be used for improved self-localization in various level of accuracy and for improved navigation.

1. When approaching an intersection, the exact location may be estimated using a simple model of distance from stop-line; and
2. Navigation with lane level awareness may allow notification of passing to correct lane or detection of potential highway exit miss before it actually happened.

Method for Calibration Removal and Tracking on Mobile System GPS

A common issue with calibrating a system is removing an early calibration method, which prevents proper localization using another layer.

GPS error may be described as noise with addition of offset coming from satellites, multi-paths in urban areas (signals "bouncing" from walls) and from other effects. Generally the offset part is very large, up to tens of meters. In modern phones there is aggregation of methods using GPS, IMU, Wi-Fi and Snap-to-Road. This causes unpredicted behavior where location recalibrates and "jumps around" from place to place. Location offsets changes are not reported directly, but are detected by combining motion dynamics with location. Each time an offset is found a virtual fix is generated and tracked. When a jump in location that does not match the car dynamics is detected, it is reduced from future readings and tracked using a separate offset. This is a key component in sparse localization where there may be a location fix every few minutes, with the assistance of GPS, while not causing the GPS offset to diverge.

The GPS offset changes may happen with every measurement (using 1 Hz as default) to 10-50 seconds, depending on conditions. Every time a new GPS offset calibration is found and uncalibrated from the next GPS readings, the change is also tracked as a partially new error and tracked for offline localization/localization with latency, using bi-directional filters/models in time to generate optimal signals.

Error estimation for regression problems is critical for fusing results. Embodiments of the present invention provide a clean approach for training a model to produce both physical values and error estimates in the same units of the measured regression.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed is:

1. A system for training simultaneous localization and mapping (SLAM) models, comprising:
at least one camera mounted in a vehicle and in communication with an image server via a cellular connection, that captures images labeled with a geographic position system (GPS) location and a timestamp, and uploads them to the image server;
a storage device that stores geographical maps and images, and indexes the images geographically with reference to the geographical maps;
an images server that receives uploaded images, labels the uploaded images with a GPS location and a timestamp, and stores the uploaded images on said storage device; and
a training server that trains a SLAM model using images labeled with a GPS location and a timestamp, wherein the SLAM model (i) receives an image as input and predicts the image location as output, and/or (ii) receives an image having error as input and predicts a local correction for the image as output.

2. The system of claim 1 further comprising at least one sensor mounted in the vehicle that sends low bandwidth sensor data to said image server, wherein said at least one sensor is a member of the group consisting of a lidar sensor, a radar sensor, an external camera, an accelerometer, a magnetometer, a phone accelerometer, a gyroscope and a barometer, wherein said training server uses the sensor data to train the SLAM model to identify elements comprising turns, speed bumps and potholes.

3. The system of claim 1 wherein said training server processes sensor data as time series data and separates that sensor data to time intervals labelled with time and location, and/or processes sensor data as spatial data and separates the sensor data according to distance into regions labelled with time and location.

4. The system of claim 1 wherein said training server maps sensor data to road conditions.

5. The system of claim 1 wherein said at least one camera is in communication with a mobile phone via wired or wireless communication, and said at least one camera transmits its captured images to a mobile phone that is connected to said image server.

6. The system of claim 1 wherein said at least one camera captures a video sequence of images with a time series of GPS and timestamp data, wherein the video sequence of images is a time-lapse or street-lapse sequence with images separated by time intervals or distance intervals, respectively, and wherein said image server synchronizes the images with the GPS and timestamp data.

7. The system of claim 1 wherein said training server trains the SLAM model to generate vehicle dynamic motion relative to a vehicle coordinate system.

8. The system of claim 1 wherein said training server detects one or more objects in an image and determines the locations of the one or more objects relative to the vehicle.

9. The system of claim 8 wherein said training server determines from which locations the one or more objects may be seen, at which angles of view.

10. The system of claim 1 wherein said training server updates maps based on images uploaded to said image server, and detects changes in updated maps vis-à-vis non-updated maps.

11. The system of claim 1 further comprising an annotation tool that enables a person to mark and upload to said image server a vehicle route for an uploaded image or sequence of images, by marking points in an aerial map, and wherein said training server determines ground truth points corresponding to the marked points.

12. The system of claim 1 wherein the SLAM model accepts as input raster or vector road images and/or aerial road images, and wherein said training server trains the SLAM model to position uploaded images relative to the road images.

13. The system of claim 12 wherein the aerial road images are pre-processed as a tiled map, at least some of the map tiles comprising one or more members of the group consisting of roads, lanes, crossings, road markings, road edges, road signs, bridges, sidewalks, parking lots, buildings and trees, and wherein said training server trains the SLAM model to determine which map tile covers a current location of the vehicle.

14. A method for training simultaneous localization and mapping (SLAM) models, comprising:
   capturing a sequence of road images by a vehicle dashboard camera, while the vehicle is moving;
   labeling the captured road images with time and GPS location;
   creating feature representations of the captured road images;
   further creating a feature representation of a map tile from aerial imagery, the map tile covering the area where the vehicle is traveling; and
   triangulating vehicle location and correcting GPS errors, comprising training a SLAM model to use feature representations of the road images and of the map tile.

15. The method of claim 14, wherein said labelling also labels the collected road images with inertial measurement data based on inertial measurement unit (IMU) sensors, the IMU sensors comprising members of the group consisting of a mobile phone, a vehicle controller area network (CAN) bus, an on-board diagnostics (OBD) module, and electronic wearables.

16. The method of claim 14, further comprising correcting localization error, comprising compressing the map tile via a trained compression model that compresses a map tile to a feature vector, comprising:
   providing a road image to the compression model together with the map tile; and
   training the compression model to fit the road image to the map tile, thereby generating a compressed vector representation of the map tile comprising correlated aerial and road view information.

17. The method of claim 14, further comprising:
   generating a full geographic area of compressed vector/pixel level segmentation of the map tile, comprising:
      annotating the map tile using segmentation and vector annotation of lanes, road borders, road features, and road crossings; and
      training the localization model on the annotated data; and
   continually updating the compressed vector/pixel level segmentation of the map tile, from up-to-date camera road images.

18. The method of claim 14, further comprising training a SLAM model to predict vehicle location from a sequence of images and GPS data, based on the compressed map tiles and/or the compressed road images.

19. The method of claim 14, further comprising using the collected camera road images to train the SLAM model to predict if a map tile is outdated in some areas, and to update an aerial raster image tile in road areas that are visible in both road and aerial views.

20. The method of claim 14, further comprising:
   running localization in real time on the mobile phone, via an external camera on the vehicle that uses the mobile phone camera or that streams video to the mobile phone; and
   transmitting the localization to other vehicles via vehicle to vehicle (V2V) communication, to enable advanced driver-assistance system (ADAS) warnings across vehicles to be accurate, and to enable warnings to be generated and dispatched to proper drivers in real time according to the location of the drivers' vehicles.

* * * * *